(12) United States Patent
Zmiyiwsky et al.

(10) Patent No.: US 10,925,700 B2
(45) Date of Patent: Feb. 23, 2021

(54) FLOSSER PEN AND METHOD OF USING THE SAME

(71) Applicant: Zee Zee Corporation, Mississauga (CA)

(72) Inventors: Zenovia Zmiyiwsky, Mississauga (CA); Vera Zmiyiwsky, Mississauga (CA); Bartek Zalewski, Richmond Hill (CA); Christopher J. Pearen, Brampton (CA)

(73) Assignee: Zee Zee Corporation, Mississauga (CA)

( * ) Notice: Subject to any disclaimer, the term of this patent is extended or adjusted under 35 U.S.C. 154(b) by 0 days.

(21) Appl. No.: 16/555,392

(22) Filed: Aug. 29, 2019

(65) Prior Publication Data

US 2019/0380816 A1    Dec. 19, 2019

Related U.S. Application Data

(60) Continuation-in-part of application No. 16/261,003, filed on Jan. 29, 2019, now Pat. No. 10,743,971, which is a division of application No. 15/170,077, filed on Jun. 1, 2016, now Pat. No. 10,231,809.

(60) Provisional application No. 62/170,229, filed on Jun. 3, 2015.

(51) Int. Cl.
  *A61C 15/02*        (2006.01)
  *B08B 1/00*         (2006.01)
  *A46B 5/00*         (2006.01)

(52) U.S. Cl.
  CPC ............ *A61C 15/02* (2013.01); *A46B 5/0008* (2013.01); *A46B 5/0095* (2013.01); *B08B 1/002* (2013.01); *A46B 2200/108* (2013.01)

(58) Field of Classification Search
  None
  See application file for complete search history.

(56) References Cited

U.S. PATENT DOCUMENTS

| | | | |
|---|---|---|---|
| 4,750,501 | A | 6/1988 | Ackermann et al. |
| 6,973,932 | B2 | 12/2005 | Ko |
| D703,955 | S | 5/2014 | Nanda |
| 2012/0279007 | A1 | 11/2012 | Boorstein |

FOREIGN PATENT DOCUMENTS

| | | |
|---|---|---|
| KR | 200261375 | 1/2002 |
| KR | 2020160004312 | 12/2016 |

*Primary Examiner* — Eric W Golightly
(74) *Attorney, Agent, or Firm* — Sand, Sebolt & Wernow Co., LPA

(57) ABSTRACT

A dental device for cleaning oral interproximal spaces, a flosser cartridge for engagement in the dental device, and method of use thereof. The implement includes a housing which receives a cradle carrying a cartridge stack. The cradle and cartridge stack are rotated by manipulating a control knob at a rear end of the housing. Rotation of the cradle causes the flosser cartridge stack to be progressively moved forwardly along a helical track toward an opening in the housing's front end. The cleaning tip on a forwardmost cartridge extends outwardly through the opening and is covered by a cap prior to use. The cap is removed when the user wishes to clean their teeth. The forwardmost cartridge is snapped off the stack and disposed of after use. Rotation of the cradle moves a second cartridge in the stack into the forwardmost position where the second cartridge is then ready for use.

12 Claims, 23 Drawing Sheets

FLOSSER PEN AND METHOD OF USING THE SAME

CROSS-REFERENCE TO RELATED APPLICATIONS

This application is a Continuation-in-Part of U.S. patent application Ser. No. 16/261,003, filed Jan. 29, 2019, now U.S. Pat. No. 10,743,971, which is a Divisional Application of U.S. patent application Ser. No. 15/170,077, filed Jun. 1, 2016, now U.S. Pat. No. 10,231,809, which application claims the benefit of U.S. Provisional Patent Application Ser. No. 62/170,229 filed Jun. 3, 2015. The entire disclosures of these applications are incorporated herein by reference.

TECHNICAL FIELD

The present disclosure relates generally to dental devices. More particularly, the present disclosure is directed to devices for interproximal cleaning; especially interproximal flossing. Specifically, the dental device includes a housing assembly having a bore that receives a cradle assembly carrying a plurality of discrete, individual flosser cartridges that are interlocked with each other into a flosser cartridge stack. Each flosser cartridge has a cleaning tip. The cradle assembly is rotated within the housing bore and the flosser cartridge stack is progressively moved forwardly along a helical track toward an opening defined in the housing's front end. The cleaning tip on a first region of a forwardmost cartridge extends outwardly through the opening and is covered by a cap when not in use.

BACKGROUND

One of the most important parts of the body that people need to take care of is their teeth. Studies show that dental health contributes to a person's overall health and failure to maintain adequate oral hygiene may place a person at risk for a variety of health issues.

An aspect of oral hygiene that has gained attention over the past decades is the need for removal of food particles that tend to accumulate between the teeth and under the gum line. Since the present disclosure of the first flossing thread in 1815, to the first toothpick in 1869, to present day interproximal brushes, inventors have been relentless in the pursuit of developing self-care products that may perform this vital job of cleaning between the teeth.

Many studies show that flossing thread, the most commonly used interproximal product, is difficult for the average person to use properly, and is therefore less effective in the prevention of plaque build up, gingivitis, and periodontitis. Using a simple wooden or plastic toothpick removes some food debris but may not do an effective cleaning job in and of itself. Additionally, manual toothbrushes are unable to adequately penetrate and clean the interproximal space. This space is considered by many to be the cradle assembly of a number of oral diseases, staining of the teeth, and of bad breath.

SUMMARY

There is therefore a continued need in the art for an improved and innovative dental device that more fully addresses the deficiencies of previously known devices and which can aid a person in maintaining proper oral hygiene.

A dental device for cleaning interproximal spaces, a flosser cartridge for engagement with the dental device, and a method of using the same is disclosed herein. The disclosed dental device solves many of the problems found with previously known devices. The disclosed dental device includes a housing assembly defining a bore that receives a cradle assembly which carries a stack of independent, discrete flosser cartridges. The flosser cartridges are interlocked with each other to form a flosser cartridge stack. Each flosser cartridge has a cleaning tip. The cradle assembly is rotated by manipulating a control knob at a rear end of the housing. The rotation of the control knob, and thereby of the cradle, causes the flosser cartridge stack to be progressively moved forwardly along a helical track and toward an opening in the housing's front end. The cleaning tip on a forwardmost cartridge extends outwardly through the opening and is covered by a cap prior to use. The cap is provided to protect the tip and keep the tip in a hygienic environment and ready for use. The cap is removed when a user wishes to floss their teeth. The forwardmost flosser cartridge is snapped off the stack and disposed of after use. Rotation of the cradle moves a second cartridge in the stack into the forwardmost position where it is ready for use. A last flosser cartridge is provided in a color different from the other cartridges to warn the user that the last flosser cartridge in the dental device is being used. The cradle is removed when all of the flosser cartridges have been utilized.

In some embodiments, a separately purchased replacement flosser cartridge stack is then inserted into the cradle and subsequently into the housing. In other embodiments, the original cradle assembly is reloaded with a plurality of separately purchased individual flosser cartridges that are individually loaded into the cradle or are formed by the consumer into a flosser cartridge stack and are then loaded into the cradle. Once the cradle is reloaded with new flosser cartridges, the cradle is engaged in the housing. In yet other instances, a separately purchased cradle that comes fully loaded with a flosser cartridge stack may be engaged in the housing and the old cradle may be disposed of. In yet other instances, the entire dental device may be disposed of once all the flosser cartridges have been used and a completely new dental device that is fully loaded with new flosser cartridges may be purchased and used. In this latter instance, the cradle may be configured in such a way that it is a permanent feature of the dental device and cannot be removed therefrom. The dental device is preferably in the shape of a slim-line pen and therefore can be easily and discretely carried.

In one aspect, the present disclosure may provide a dental device comprising a housing having a front end, a rear end, and a longitudinal axis extending between the front end and the rear end; a bore defined in the housing and extending longitudinally between the front end and the rear end; a cradle assembly; one or more flosser cartridges carried by the cradle assembly, each of the one or more flosser cartridge including a cleaning tip; wherein at least a portion of the cradle assembly that carries the one or more flosser cartridges is received in the bore and is selectively rotatable about the longitudinal axis; and a translation mechanism operable to move the one or more flosser cartridges relative to the portion of cradle assembly and through the bore towards an opening defined in the front end of the housing.

The translation mechanism includes a groove defined in one of an interior surface of the housing that defines the bore and an exterior surface of each of the one or more flosser cartridges; and a ridge defined on the other of the interior surface of the housing and the exterior surface of each of the one or more flosser cartridges, wherein the groove and ridge are complementary and the ridge is received in the groove.

In one example, the groove is defined in the interior surface of the housing and is a helical groove. In one aspect, the portion of the cradle assembly includes one or more elongate members that bound and define a bore within which the one or more flosser cartridges are received. The portion of the cradle assembly further defines at least one slot that is in communication with the bore; and wherein a region of the one or more flosser cartridges extends through the at least one slot. In one aspect, the ridge that engages in the groove is provided on the region of the one or more flosser cartridges that extends through the at least one slot.

In one example, the cradle assembly includes an elongate member that is C-shaped in cross-section. The C-shaped elongate member extends through about 270 degrees of a circumference of a circle. The C-shaped elongate member further defines a slot therein extends through about 90 degrees of the circumference of the circle.

In one example, each of the one or more flosser cartridges includes a cleaning tip that extends longitudinally outwardly therefrom. The cleaning tip may comprise a flosser brush. The flosser brush may include a central core and a plurality of bristles that extend radially outwardly from the core. The plurality of bristles may be arranged in a helical array. The flosser brush may taper outwardly from a front end of the flosser cartridge to a tip located remote from the front end of the flosser cartridge.

In one example, the dental device further includes a control knob and the one or more elongate members extend longitudinally outwardly from the control knob; and wherein at least a portion of the control knob is located outside the bore of the housing. In one example, a locking member is interposed between the cradle assembly and the rear end of the housing. One or more first locking teeth are provided on the locking member and one or more second locking teeth are provided on the cradle assembly. The locking member is movable linearly relative to the housing between a first position and a second position. When the locking member is in the first position, the first locking teeth and the second locking teeth are engaged and the cradle assembly cannot rotate about the longitudinal axis. When the locking member is in the second position, the first locking teeth are disengaged from the second locking teeth and the cradle assembly is able to rotate about the longitudinal axis. A spring is provided that biases the locking member into the first position.

In another aspect, the present disclosure may provide a method of cleaning an interdental space comprising rotating a cradle carrying one or more cartridges within a bore of a housing of a dental device; moving the one or more cartridges forwardly within the bore and towards an opening defined in a front end of the housing as the cradle is rotated; extending a cleaning tip of a first cartridge of the one or more cartridges outwardly from the opening in the front end of the housing; and cleaning at least one interproximal space in a user's mouth with the cleaning tip.

In one example, the rotating of the cradle is preceded by moving a locking member forwardly toward the front end of the housing. The locking member is held in a forward position while rotating the cradle. The moving of the locking member forwardly disengages locking teeth on the locking member from locking teeth provided on the cradle. Moving the locking member forwardly compresses a spring. When the locking member is released, the spring moves the locking member rearwardly under spring force and re-engages the locking teeth on the locking member with locking teeth on the cradle and prevents rotation of the locking member.

In one example, the moving of the one or more cartridges forwardly within the bore includes guiding the one or more cartridges along a helical track. The method further includes rotating the one or more cartridges within the bore as the one or more cartridges are guided along the helical track.

In another aspect, the present disclosure may provide a flosser cartridge comprising a body having a peripheral wall with a first end and a second end, wherein the body has a longitudinal axis extending between the first end and the second end; a cleaning tip extending longitudinally outwardly from the first end, and one of a groove or a ridge provided on the peripheral wall, wherein the one of the groove or the ridge is oriented at an angle relative to the longitudinal axis. The flosser cartridge further includes a projection provided on the body, wherein the projection extends longitudinally along at least a portion of the body; and wherein the one of the groove and the ridge is provided on the projection. In one example, the one of the groove and the ridge is oriented at an angle relative to the longitudinal axis. In one example, the projection is trapezoidal in cross-section. In one example, a rest of the body other than the projection is generally circular in cross-section.

In one example the cleaning tip of the flosser cartridge is a flosser brush. The flosser brush may be a tapered brush that is narrowest at a tip and widest proximate the body of the cartridge. The bristles on the brush may be arranged in a helical array and extend outwardly from a metal core embedded in the body at one end and extending outwardly along the longitudinal axis.

In one example, the body of the flosser cartridge includes a first region and a second region extending longitudinally from the first region, where both the first region and the second region have a same cross-section but the second region is of greater dimensions that the first region. The body of the flosser cartridge defines a bore that is accessible through an opening defined in the second end of the body. The bore is shaped and sized to be complementary to the first region of the body. At least one aperture is defined in the second region of the body and the at least one aperture is in fluid communication with the bore. The bore is adapted to receive a first region of an identical second cartridge therein. At least one flange extends outwardly from the first region and the at least one flange is complementary in shape and size to the at least one aperture.

BRIEF DESCRIPTION OF THE SEVERAL VIEWS OF THE DRAWINGS

Sample embodiments are set forth in the following description, are shown in the drawings, and are particularly and distinctly pointed out and set forth in the appended claims.

Similar numbers refer to similar parts throughout the drawings.

DETAILED DESCRIPTION

Figure 1:
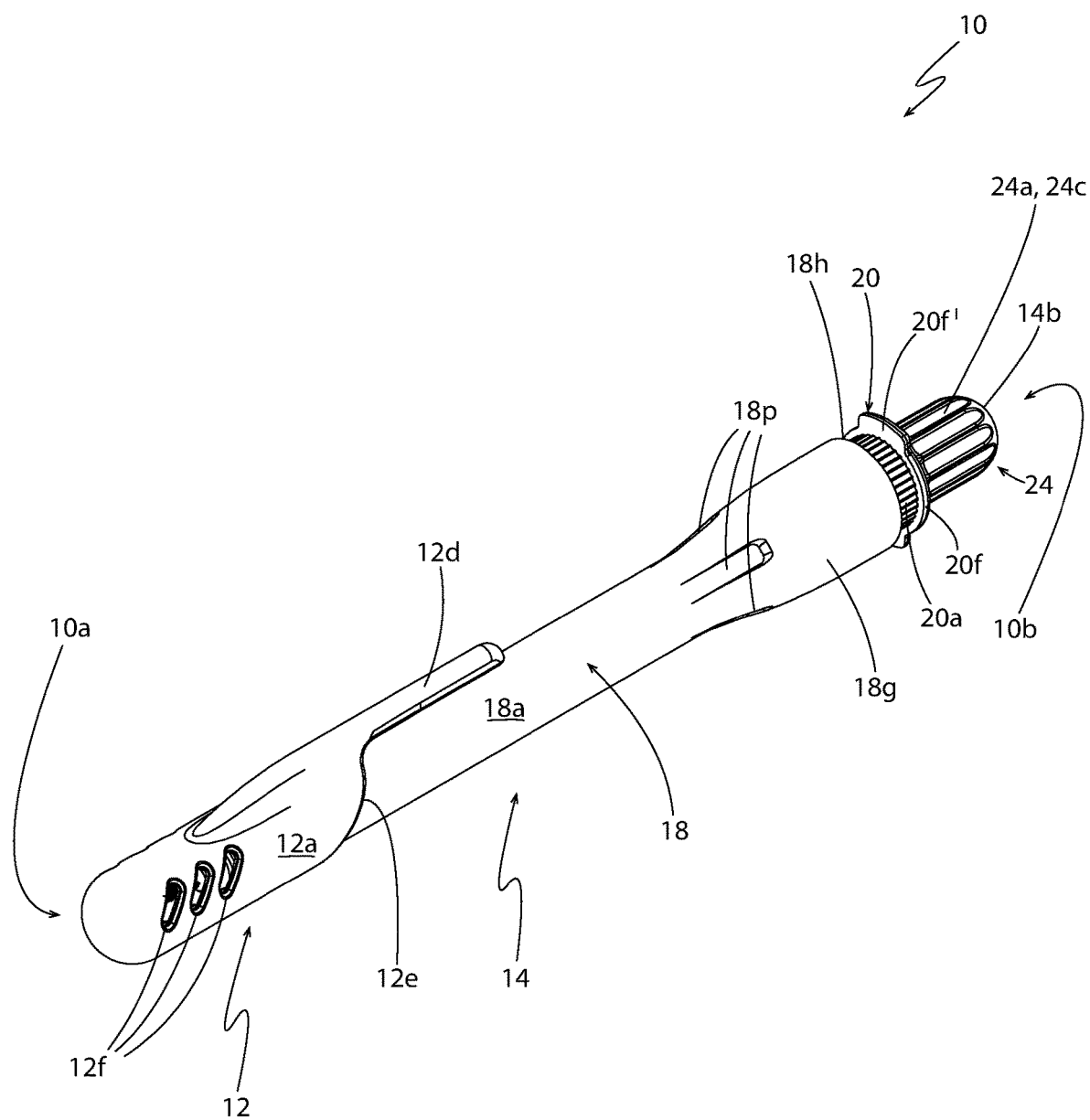
FIG. 1 is a front, top, perspective view of a dental device in accordance with the present disclosure, where a cap is shown engaged with a housing assembly of the dental device.

Referring to FIGS. 1-17, a dental device in accordance with an aspect of the present disclosure is illustrated and is generally indicated at 10. As shown in FIGS. 1 and 2, dental device 10 includes a cap 12 that is selectively engaged with a housing assembly 14. Dental device 10 is shaped and sized to have an appearance similar to a slim line pen. This configuration helps the dental device 10 to be readily and discretely carried and used. A user may clip the dental device 10 to a shirt pocket for example, and observers would assume the device to be a pen, not a device for flossing teeth. The slim profile of the dental device 10 also makes the device easy to hold and manipulate.

Cap 12 includes a cap body 12a that is generally cylindrical and bounds and defines an interior bore 12b. One or more cap lock tabs 12c extend inwardly from an interior surface of the cap body 12a and into bore 12b. Cap lock tabs 12c are provided to interlockingly engage with complementary regions on housing assembly 14 to latch cap 12 to housing assembly 14. This will be described later herein. Cap 12 further includes a clip 12d that extends outwardly from cap body 12a for a distance beyond an end 12e thereof. As discussed above clip 12d aids in giving dental device the physical appearance of a pen but further serves a useful purpose in that the clip 12d helps a user to hook dental device 10 to any suitable article, such as to a shirt pocket, for instance.

Cap 12 also defines one or more slots 12f that extend from an exterior surface of cap body 12a to an interior surface thereof. The interior surface is that surface that bounds and defines bore 12b. Slots 12f place bore 12b in fluid communication with the air surrounding the exterior surface of cap 12. Slots 12f act to allow liquids to drain from bore 12b and also allow airflow therethrough and therefore help to promote a sanitary environment under cap 12.

Housing assembly 14 is configured to receive, carry, and separately present for use a plurality of flosser cartridges 16. The terms "cartridge" and "flosser cartridges" are used herein to describe a component that has a cleaning tip provided thereon for removing plaque, food etc. from an interproximal space in a user's mouth. The type of cleaning tip may be any one of a plurality of tools useful for removing plaque, food etc. and is not limited to a flossing tool. Regardless of the type of cleaning tip utilized, cartridges 16 or flosser cartridges 16 are contemplated to be disposable components that are used once and are then thrown away. In some instances, the flosser cartridges 16 may be used more than once and then be thrown away. It is further contemplated that the dental device 10 may be reloaded with replacement flosser cartridges. However, in other instances, the dental device 10 may be purchased fully loaded with flosser cartridges 16 but then the entire dental device 10 is disposed of once all of the flosser cartridges have been used.

Figure 5:
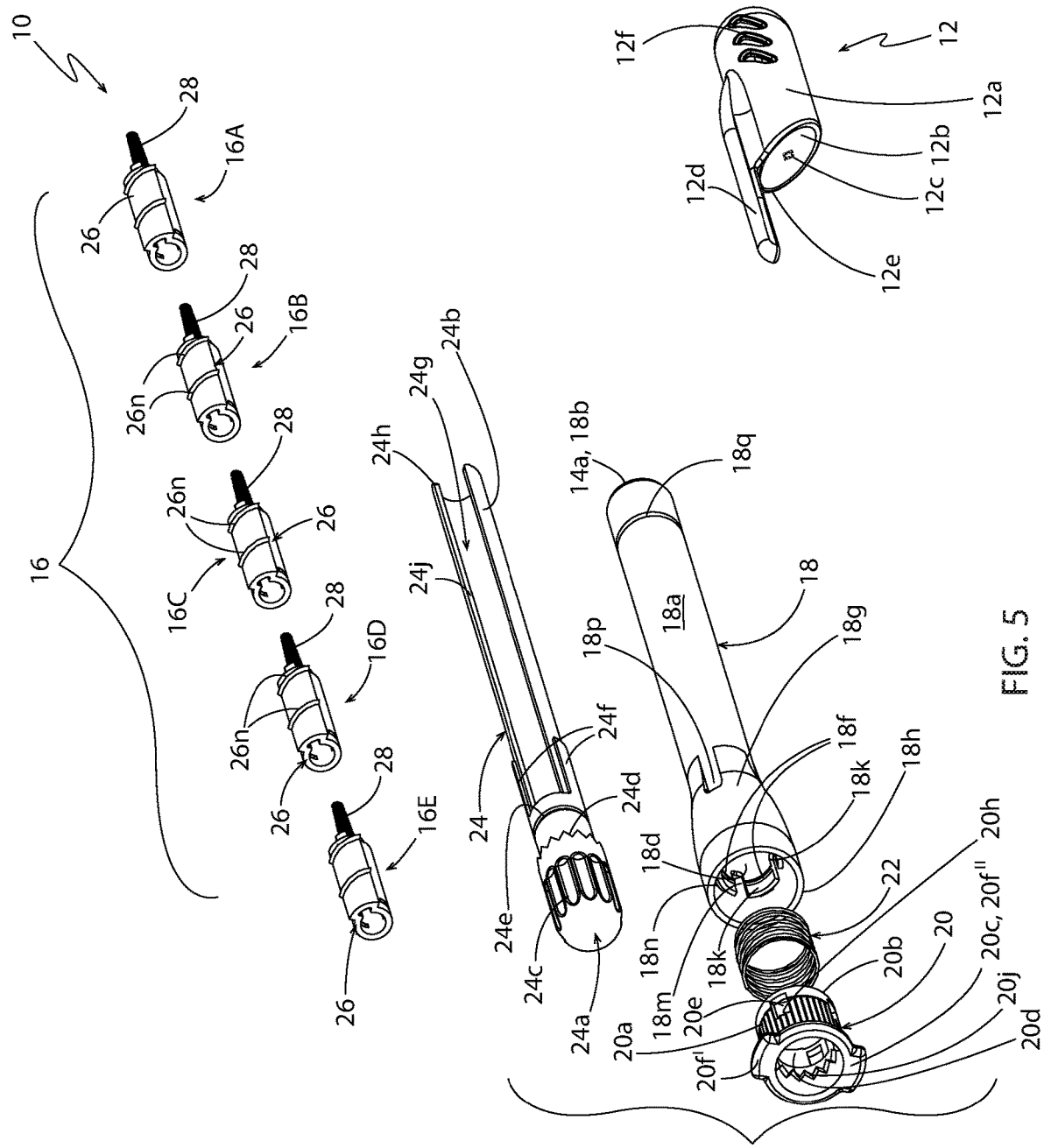
FIG. 5 is an exploded rear, top, perspective view of the dental device including a first embodiment of a cradle assembly.
Figure 6:
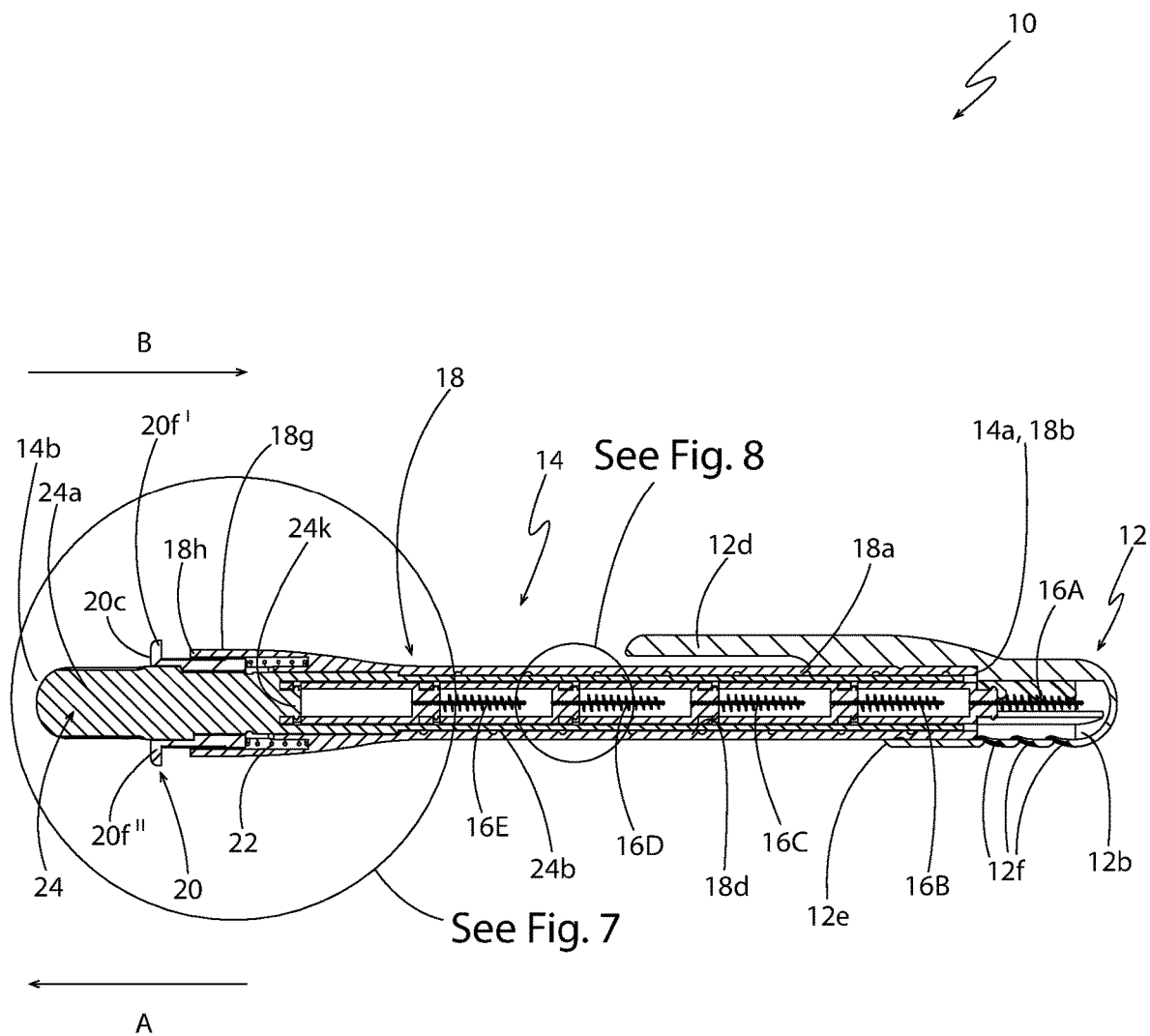
FIG. 6 is a longitudinal cross-section of the dental device taken along line 6-6 of FIG. 4.
Figure 7:
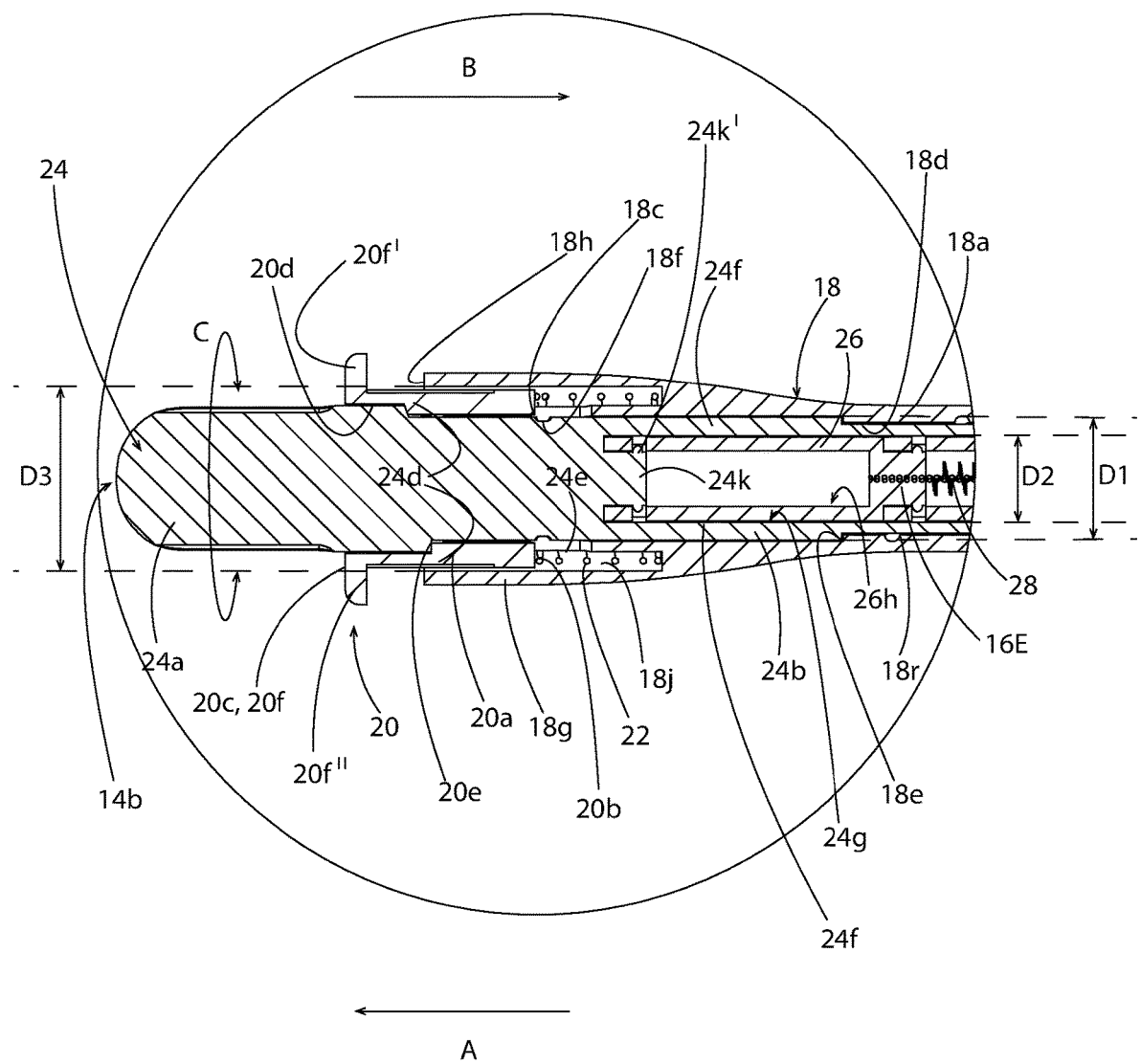
FIG. 7 is an enlarged detail view of a first area circumscribed within FIG. 6.
Figure 8:
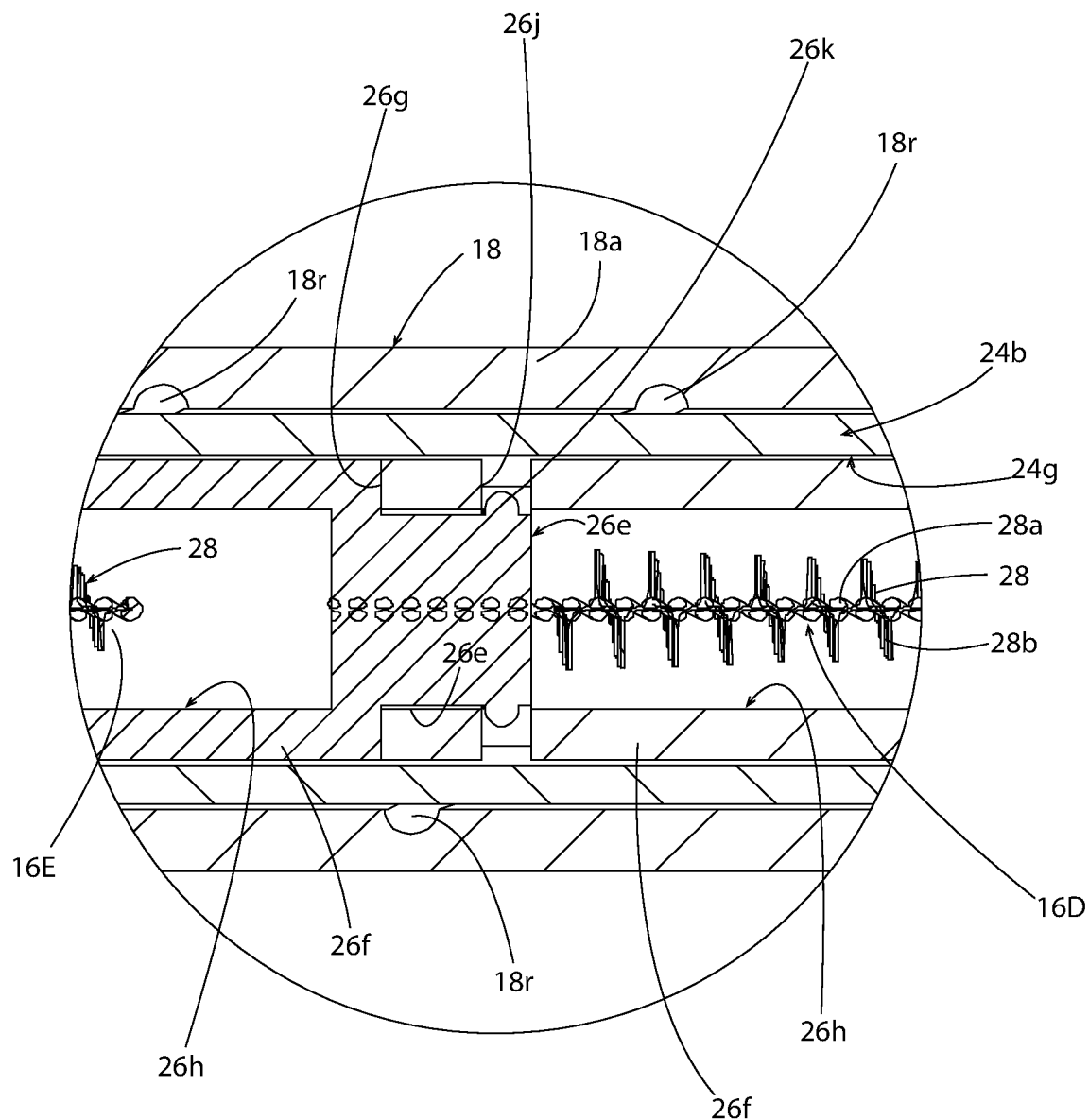
FIG. 8 is an enlarged detail view of a second area circumscribed within FIG. 6.
Figure 9:
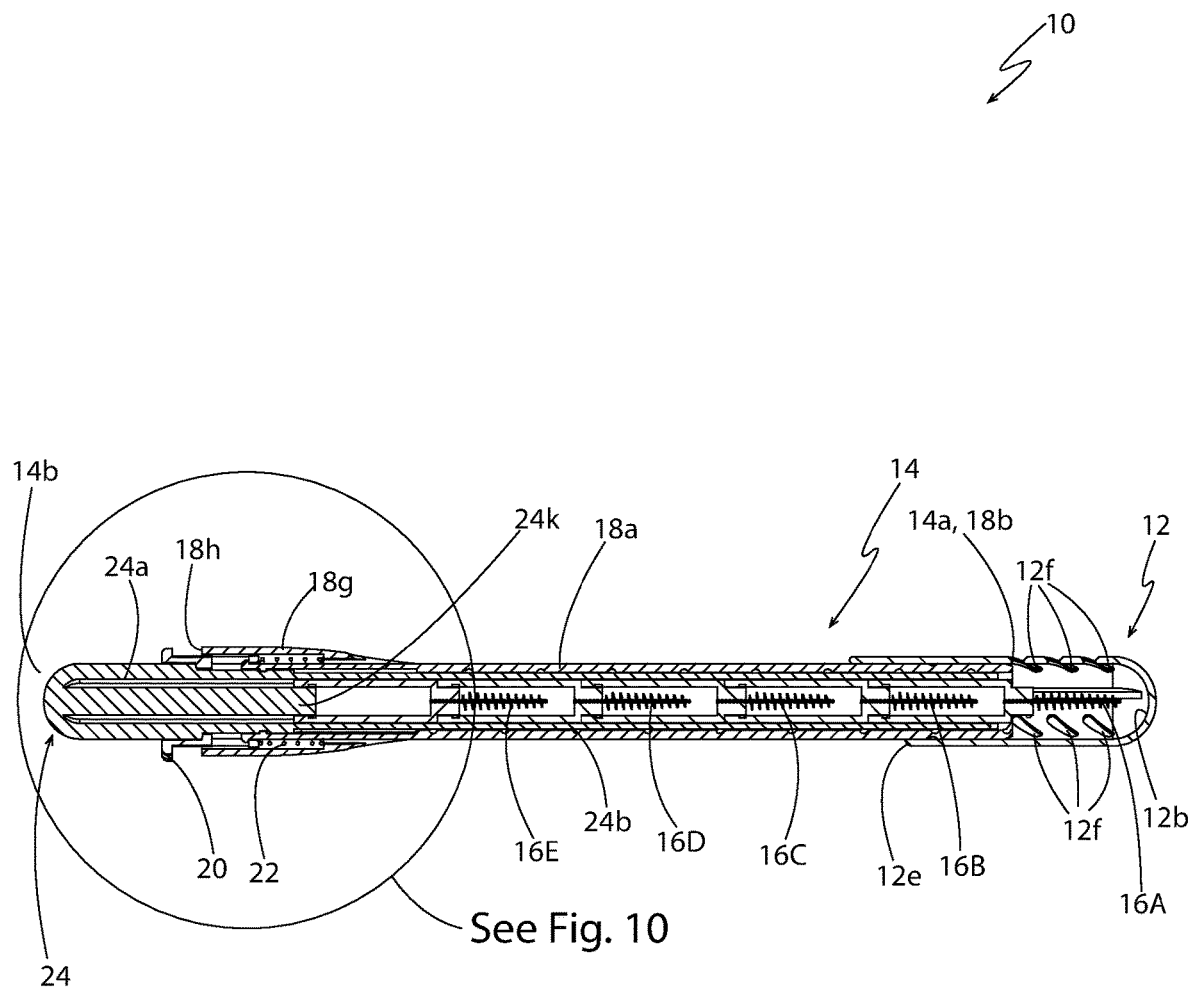
FIG. 9 is a longitudinal cross-section of the dental device taken along line 9-9 of FIG. 4.

As best seen in FIGS. 5 through 7, housing assembly 14 includes a housing 18, a locking member 20, and a spring 22 that is captured between housing 18 and locking member 20.

Housing 18 comprises a generally tubular member having a peripheral wall 18a with a front end 18b and a rear end 18c (FIG. 7). The tubular member has a longitudinal axis that extends from front end 18b to rear end 18c and is centrally located within a bore 18d bounded and defined by an interior surface of wall 18a. Bore 18d extends longitudinal from an opening defined in front end 18b to an opening defined in rear end 18c. A shoulder (FIG. 7) 18e is defined in the interior surface of wall 18a a distance forwardly from rear end 18c. From shoulder 18e to proximate an opening defined in rear end 18c, the bore 18d is of a substantially constant interior first diameter "D1". Bore 18d is of a substantially constant interior second diameter "D2" from shoulder 18e forwardly up to an opening to bore 18d defined in front end 18b. Second diameter "D2" is smaller than first diameter "D1". FIG. 7 also shows that an annular ring 18f extends inwardly into bore 18d proximate the opening in rear end 18c. Bore 18d is of a third diameter "D3" extending rearwardly from rear end 18c to end 18h. Third diameter "D3" is greater than first diameter "D1".

FIGS. 2 and 7 show that the exterior diameter of wall 18a is substantially constant from front end 18b to an annular region located a distance inwardly from rear end 18c. From that region rearwardly to rear end 18c, the exterior diameter of wall 18a flares outwardly. FIG. 7 shows that the region where the exterior diameter begins to flare outwardly is generally transversely aligned with shoulder 18e. The flared area is identified in the figures by the reference character 18g. Flared region 18g may be formed by overmolding a flared member over a portion of the tubular wall 18a proximate rear end 18c. Overmolded flared region 18g extends outwardly for a distance beyond rear end 18c and terminates in an end 18h. An annular recess 18j (FIG. 7) is defined between an exterior surface of the wall 18a and an interior surface of the overmolded flared region 18g. Recess 18j is in fluid communication with the bore 18d of housing; particularly with the region of bore 18d that is of a third diameter "D3" as shown in FIG. 7. As will be described further herein, spring 22 and a portion of locking member 20 are received within this annular recess 18j.

Figure 14:
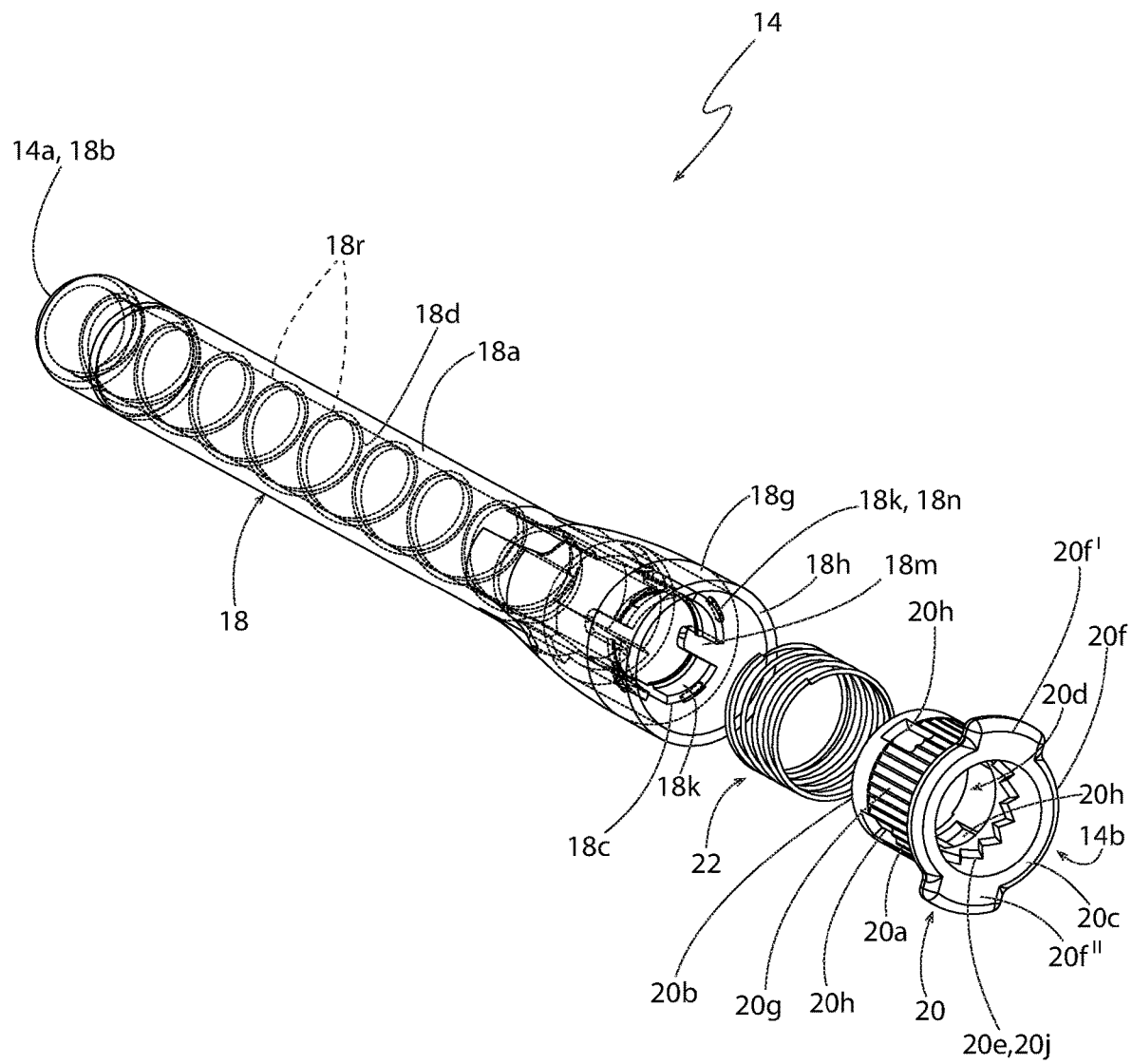
FIG. 14 is an exploded rear, top, perspective view of the housing assembly along with the locking member and spring.

FIGS. 5, 10, 14, and 17 show that a portion of the wall 18a proximate rear end 18c is formed into a plurality of circumferentially spaced-apart member capture tabs 18k. Housing 18 is illustrated as having four equidistantly spaced-apart member capture tabs 18k but fewer than four tabs 18k or more than four tabs 18k may be provided. Adjacent member capture tabs 18k are separated from each other by a longitudinally-extending opening 18m (FIG. 14). Each opening 18m extends forwardly from rear end 18c of wall 18a and places bore 18d in communication with recess 18j. A portion of the annular ring 18f is located on the interior surface of each member capture tab 18k. In other embodiments, the annular ring 18f may, instead be formed on a portion of the interior surface that is located further forwardly towards front end 18b of wall 18a instead of on the member capture tabs 18k. Each member capture tab 18k is also provided a locking detent 18n that projects radially outwardly into recess 18j. The purpose of annular ring 18f, locking tabs 18k and locking detents 18n will be described later herein.

The exterior surface of flared region 18g of housing 18 includes a plurality of injection-molding relief features 18p. Additionally, an annular ring 18q (FIG. 5) projects radially outwardly from the exterior surface of wall 18a a short distance rearwardly from front end 18b. Annular ring 18q is utilized to frictionally latch cap 12 on housing 18.

In accordance with an aspect of the present disclosure, a groove is defined in the interior surface of the wall 18a of the tubular member of housing 18. Groove 18r comprises a part of a translation mechanism which is used to progressively move flosser cartridges 16 along the length of housing 18 and towards front end 18b as will be later described herein. The groove 18r originates proximate front end 18b and terminates proximate shoulder 18e defined in housing a distance inwardly from rear end 18c. Groove 18r therefore extends for about 70% of the length of housing 18. The groove cooperates with a complementary component provided on each of the flosser cartridges 16 as will be described later herein. Together, the groove 18r and the complementary component on the flosser cartridges 16 forms a track. In accordance with one aspect of the present disclosure, the groove is a helical groove 18r that spirals around the interior surface of the wall 18a. The engagement of flosser cartridges 16 in groove 18r will be described in detail later herein.

It will be understood, that in other embodiments a substantially straight groove, a curved groove, or a sinuous groove could be used instead of the helical groove 18r.

Spring 22 is a compression spring that has coils sized to be received within recess 18j of housing 18. Spring 22 is movable between a non-compressed position (also referred to herein as an at rest position) shown in FIG. 11 and a compressed condition shown in FIGS. 12 and 13. Spring 22 is moved to the compressed condition by locking member 20 be moved relative to housing 18.

Referring to FIGS. 5, 7 and 14, locking member 20 is generally tubular member that includes a peripheral wall 20a having a first end 20b and a second end 20c, and a longitudinal bore 20d extending from an opening in first end 20b to an opening in second end 20c. An exterior diameter of peripheral wall 20a is such that first end 20b and a portion of peripheral wall 20a are received within the bore 18d of the housing 18. In particular, a portion of the peripheral wall 20a including first end 20b is received in the third diameter "D3" region of bore 18d of housing 18. Locking member 20 is movable within the third diameter "D3" region of bore 18d longitudinally toward and away from rear end 18d of housing. In some instances, a portion of first end 20b may abut or be moved forwardly to proximate rear end 18d and a further portion of first end 20b extends radially outwardly across an entryway to annular recess 18j. When spring 22 is position within recess 18j, when locking member 20 is moved forwardly toward front end 18b (and consequently toward rear end 18c) of housing, first end 20b of locking member 20 compressing spring 22 into annular recess 18j. When locking member 20 is moved rearwardly away from front end 18b (and consequently away from rear end 18c) of housing 18, spring 22 is permitted to return to its uncompressed state and may extend at least partially rearwardly out of recess 18j.

As best seen in FIGS. 7 and 14, the bore 20d of locking member 20 has a first region that is of approximately the same internal diameter as the internal diameter "D1" of bore 18d. This first region of bore 20d originates proximate first end 20b and extends rearwardly toward second end 20c. The bore 20d of locking member includes a second region of a greater internal diameter than diameter "D1". This second region originates at a shoulder 20e defined in peripheral wall 20a and terminates proximate second end 20c. The diameter of the second region is greater than diameter "D1" but is less than the diameter "D3".

Referring to FIGS. 4, 5, 7, and 14 locking member 20 includes an annular collar 20f that extends radially outwardly beyond an exterior surface of peripheral wall 20a. Second end 20c comprises an end surface of collar 20f. The annular collar 20f also includes a first flange 20f' and an opposed second flange 20f" that extend radially further outwardly than the rest of collar 20f. FIGS. 5 and 14 show that the exterior surface of wall 20a includes a plurality of alternating ridges and valleys 20g which are oriented generally parallel to the longitudinal axis "Y" of dental device 10. The alternating ridges and valleys 20g extend forwardly from collar 20f and terminate a distance rearwardly from the first end 20b. Consequently, a substantially smooth annular ring is defined between first end 20b and the beginning of the alternating ridges and valleys 20g.

A plurality of openings 20h is defined in the wall 20a a short distance rearwardly from first end 20b. The openings 20h extend from the exterior surface of the wall 20a to the interior surface thereof and are in fluid communication with bore 20d. Openings 20h are radially spaced from one another. The spacing between adjacent openings 20h is complementary to the spacing between adjacent locking detents 18n on housing wall 18a. Openings 20h are of a greater longitudinal dimension that the detents 18n on housing wall 18a. Detents 18n received in openings 20h and therefore keep the locking member 20 in a fixed rotational orientation relative to housing 18. In other words, locking member 20 does not rotate about longitudinal axis "Y" of housing 18. Locking member 20 is, however, able to slide longitudinally relative to housing 18 and when this occurs, detents 18n effectively "travel" along openings 20h. In other words, the openings 20h permit locking member to slide longitudinally back and forth relative to housing 18 while remaining engaged therewith.

FIGS. 5 and 14 also show that a plurality of locking teeth 20j is provided on a region of the interior surface of locking member 20. Locking teeth 20j are located a distance inwardly from second end 20c and are arranged in an annular ring that circumscribes bore 20d. Locking teeth 20j project rearwardly toward second end 20c and may form at least a part of the shoulder 20e.

Figure 15:
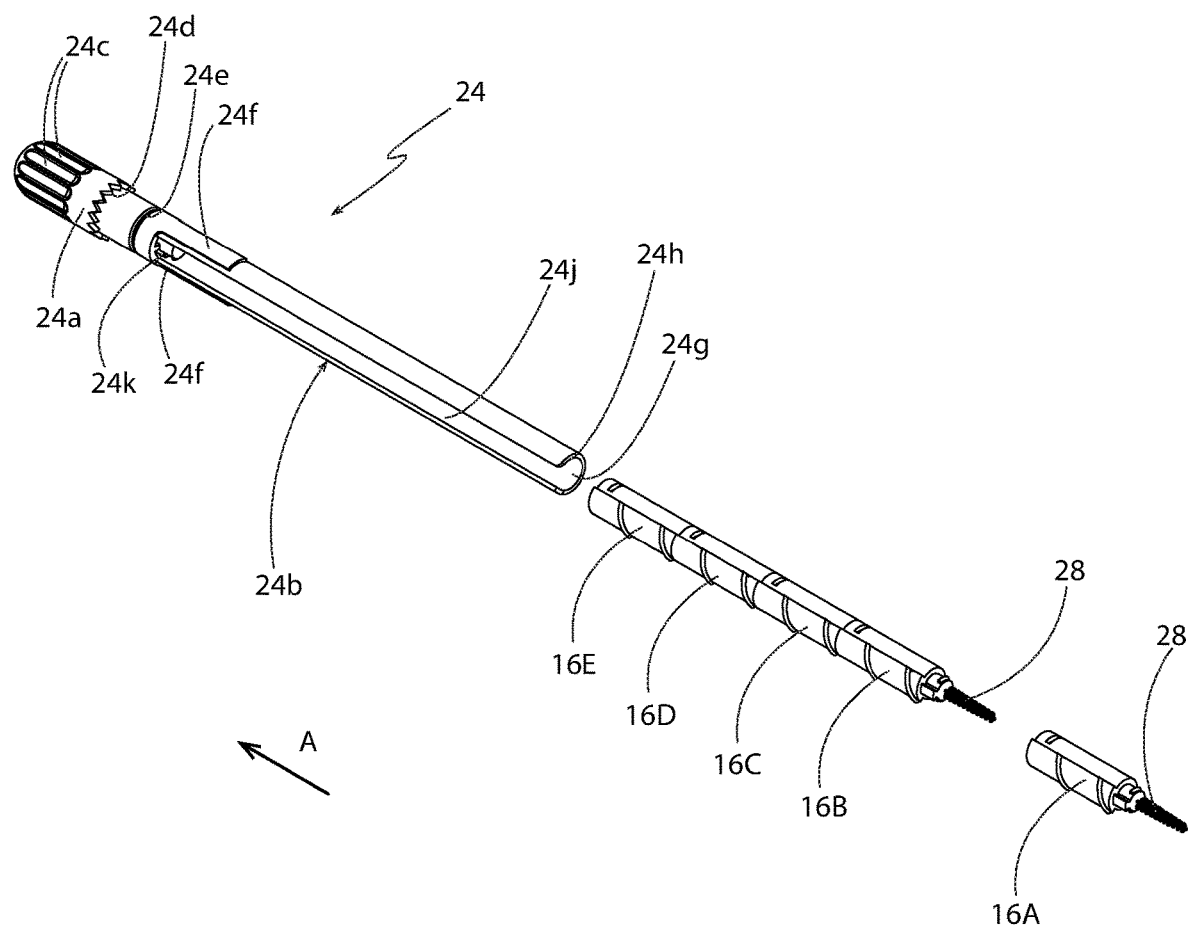
FIG. 15 is a front, top, perspective view of the first embodiment cradle assembly showing a plurality of first embodiment flosser cartridges exploded outwardly therefrom with four cartridges engaged with each other to form a flosser cartridge stack, and showing a fifth flosser cartridge separated from the stack.

In accordance with a further aspect of the present disclosure, dental device 10 further comprises a cradle assembly 24 that is engaged with housing assembly 14 and is configured to hold a plurality of flosser cartridges 16 therein. Cradle assembly 24 forms part of the translation mechanism that is utilized to move flosser cartridges 16 through housing assembly 14. As best seen in FIGS. 5 and 15, cradle assembly comprises a control knob 24a and a cradle 24b that extends longitudinally forwardly from control knob 24a. Cradle 24b comprises an elongate member that is received within bore 18d of housing 18. Control knob 24a includes a first region provided with knurling 24c or some other type of texturing on its exterior surface so control knob 24a is easy to grip and manipulate. An annular ring of locking teeth 24d is provided on control knob 24a in a region located forwardly of the knurling 24c. Locking teeth 24d are configured to be complementary to the locking teeth 20j on locking member 20 and to be selectively interlockingly engaged therewith or disengaged therefrom as will be discussed later herein. An annular groove 24e extends outwardly from the exterior surface of control knob 24a forwardly of the ring of locking teeth 24d. Groove 24e is oriented transversely to the longitudinal axis "Y" of dental device 10 when cradle assembly 24 is engaged with housing 18. Groove 24e is utilized to secure cradle assembly 24 with housing 18 through interlocking engagement of the locking detents 18n therein. A pair of opposed flanges 24f extend outwardly and forwardly from a leading end of control knob 24a. The opposed flanges 24f frictionally engage a rear end of cradle 24 therebetween.

A first embodiment cradle 24b is an elongate member that is generally C-shaped in cross-section and defines a bore 24g that extends from a rear end of the elongate member (that engages control knob 24a) to a front end 24h. Cradle 24b is C-shaped in cross-section for the entire length thereof. A longitudinally-oriented slot 24j is defined in cradle 24b and extends for the entire length of cradle 24b from control knob 24a to front end 24h. Slot 24j is in fluid communication with bore 24g. As will be described later herein, the C-shape of cradle 24b extends for about 270 degrees of a circumference of a circle and slot 24j extends for about 90 degrees of the circumference of the circle. This configuration (i.e., the 270 degree C.-shape) tends to give cradle 24b sufficient rigidity so as to not flex to a substantial degree as cradle assembly 24 rotates about longitudinal axis "Y" as will be described later herein.

Figure 10:
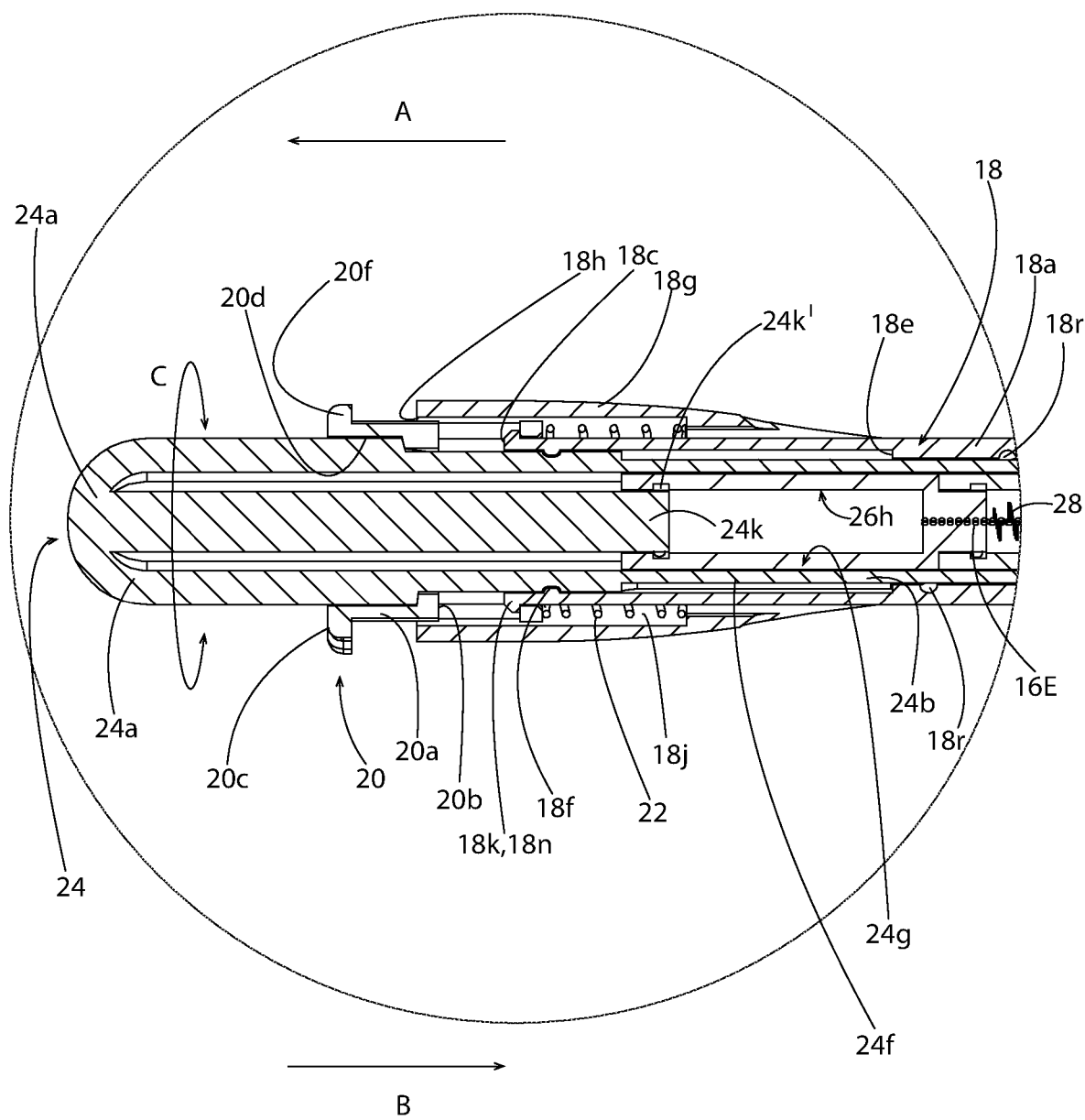
FIG. 10 is an enlarged detail view of an area circumscribed within FIG. 9.
Figure 11:
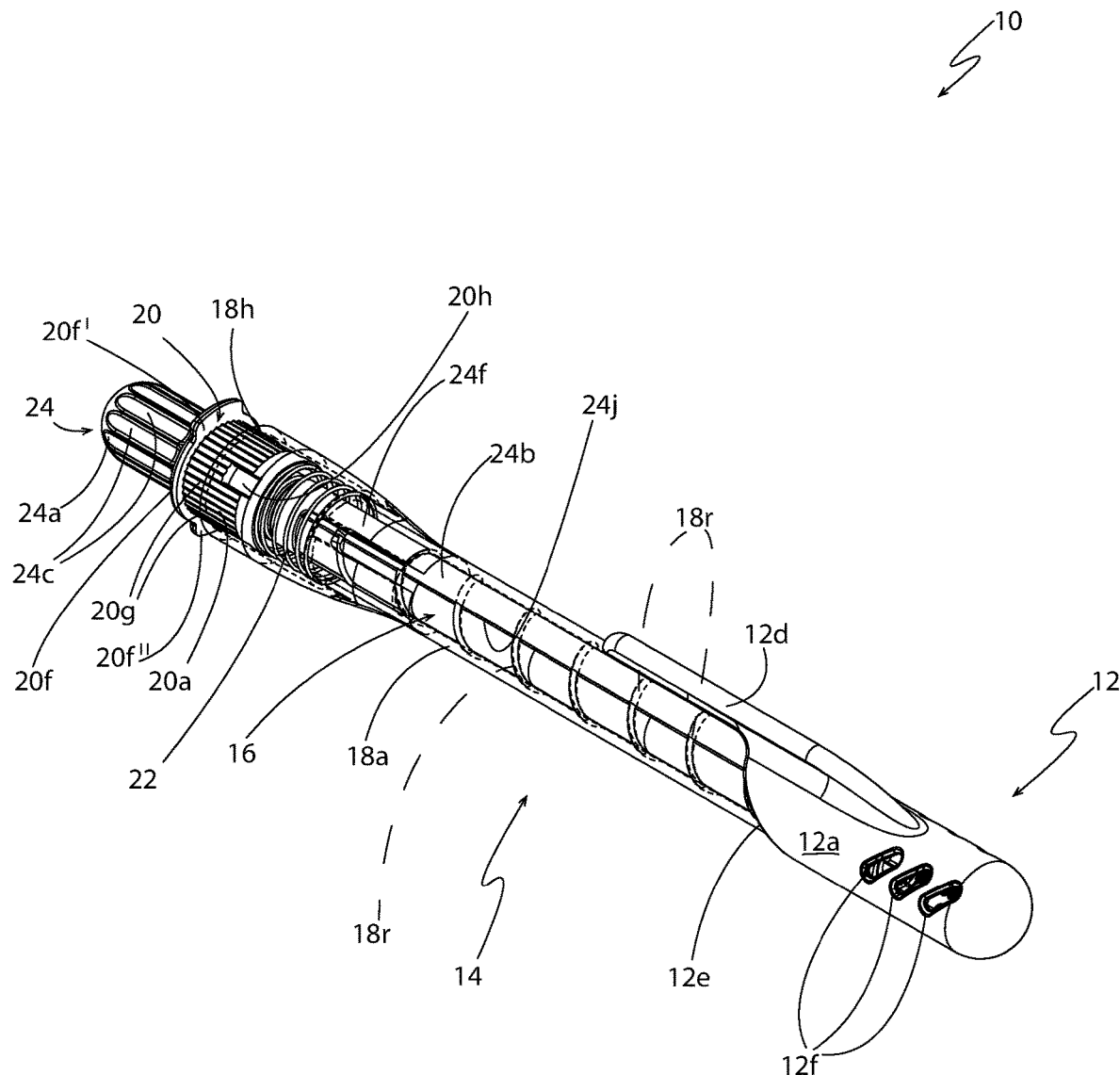
FIG. 11 is a front, top, perspective view of the dental device with the cap engaged and showing the body of the housing assembly in phantom so that the helical track is seen, and further showing the locking member in an at rest position where the cradle assembly is not free to rotate.

As best seen in FIGS. 10 and 15, a boss 24k is provided at the leading end of control knob 24a and extends forwardly for a distance between flanges 24f. When the rear end of cradle 24b is engaged between flanges 24f, boss 24k projects for a distance inwardly into bore 24g of cradle 24b. Boss 24k includes a pair of snaps 24k' (FIG. 7) that extend radially outwardly therefrom and are utilized to interlockingly secure a rearmost flosser cartridge 16 to cradle assembly 24, as will be later described herein. The interlocking engagement of the rearmost flosser cartridge with boss 24k allows for secure shipping of dental device 10 and provides safety for the user during use of dental device 10 because a stack of interlocked flosser cartridges, such as flosser cartridge stack 16A-16E, will not tend to disengage from cradle 24.

Figure 15A:
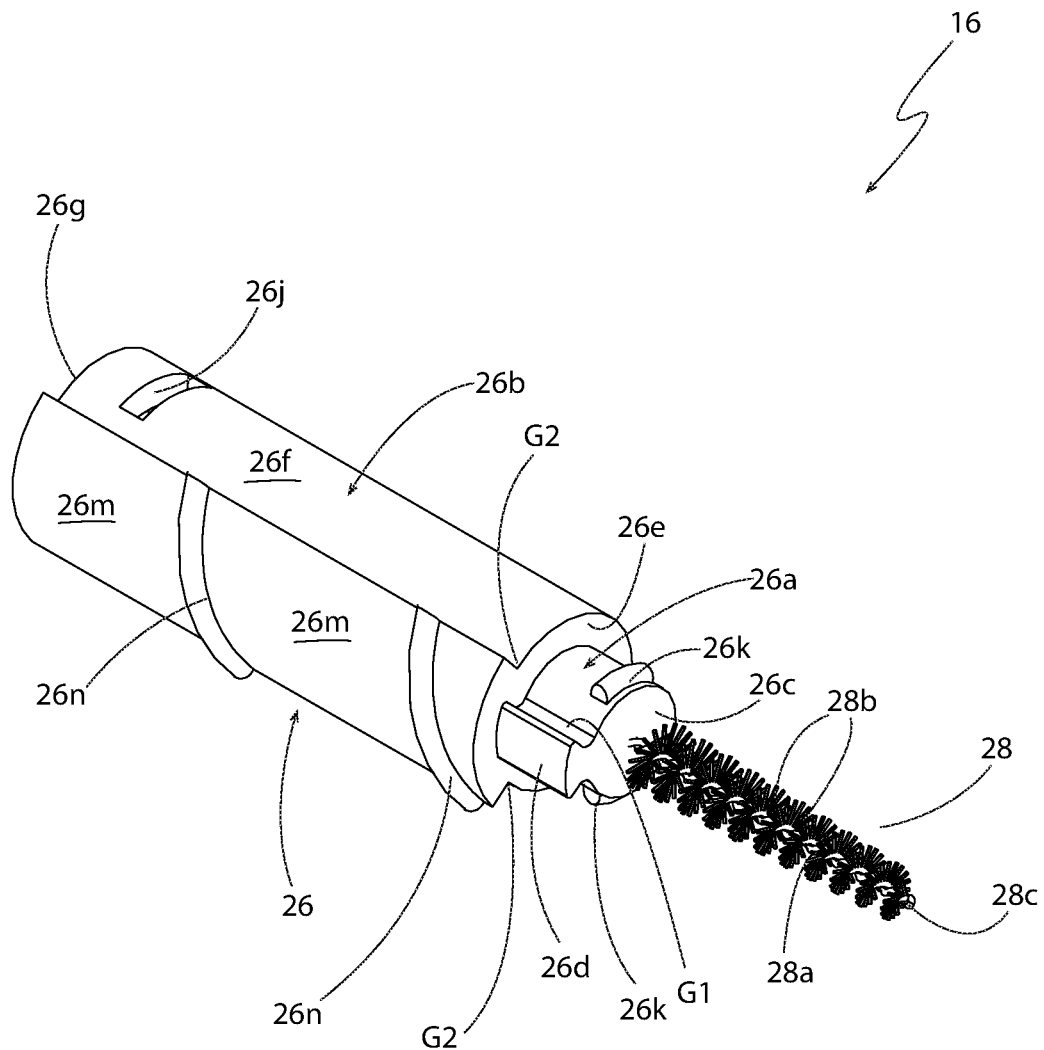
FIG. 15A is an enlarged front, top, perspective view of an exemplary flosser cartridge.
Figure 15B:
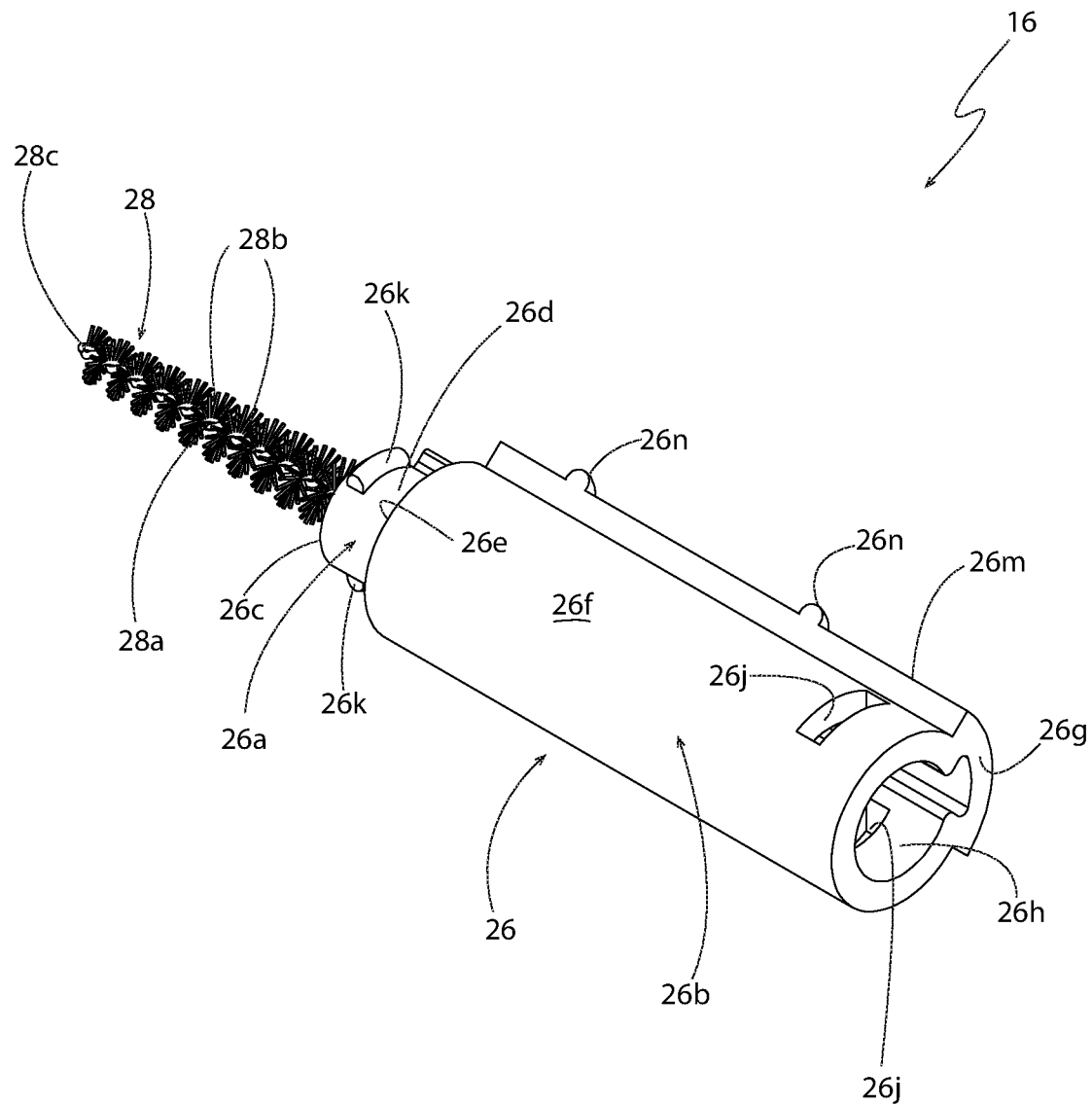
FIG. 15B is an enlarged rear, top, perspective view of the exemplary flosser cartridge.
Figure 16:
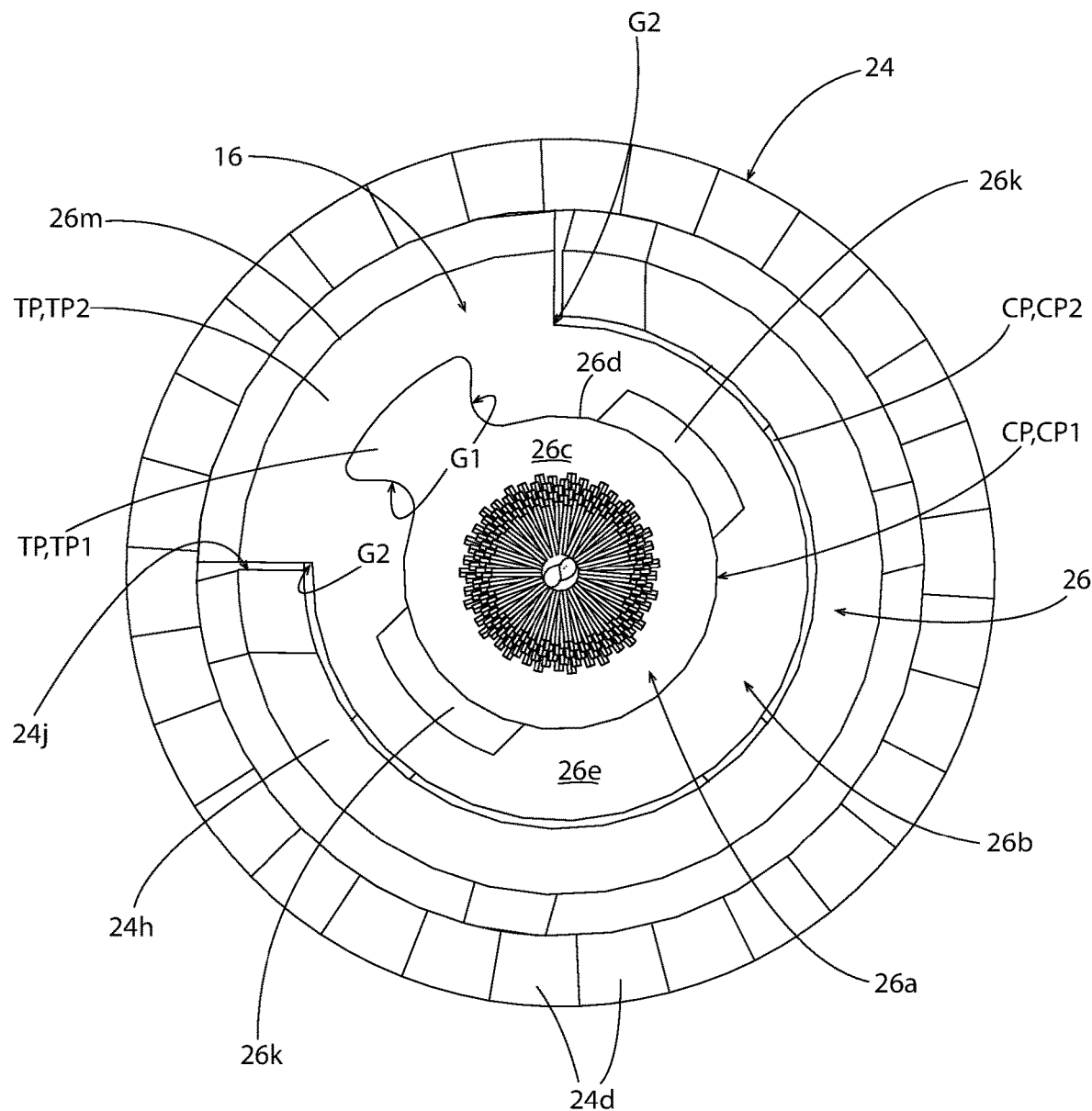
FIG. 16 is a front elevation view of the fully loaded cradle assembly shown on its own.
Figure 17:
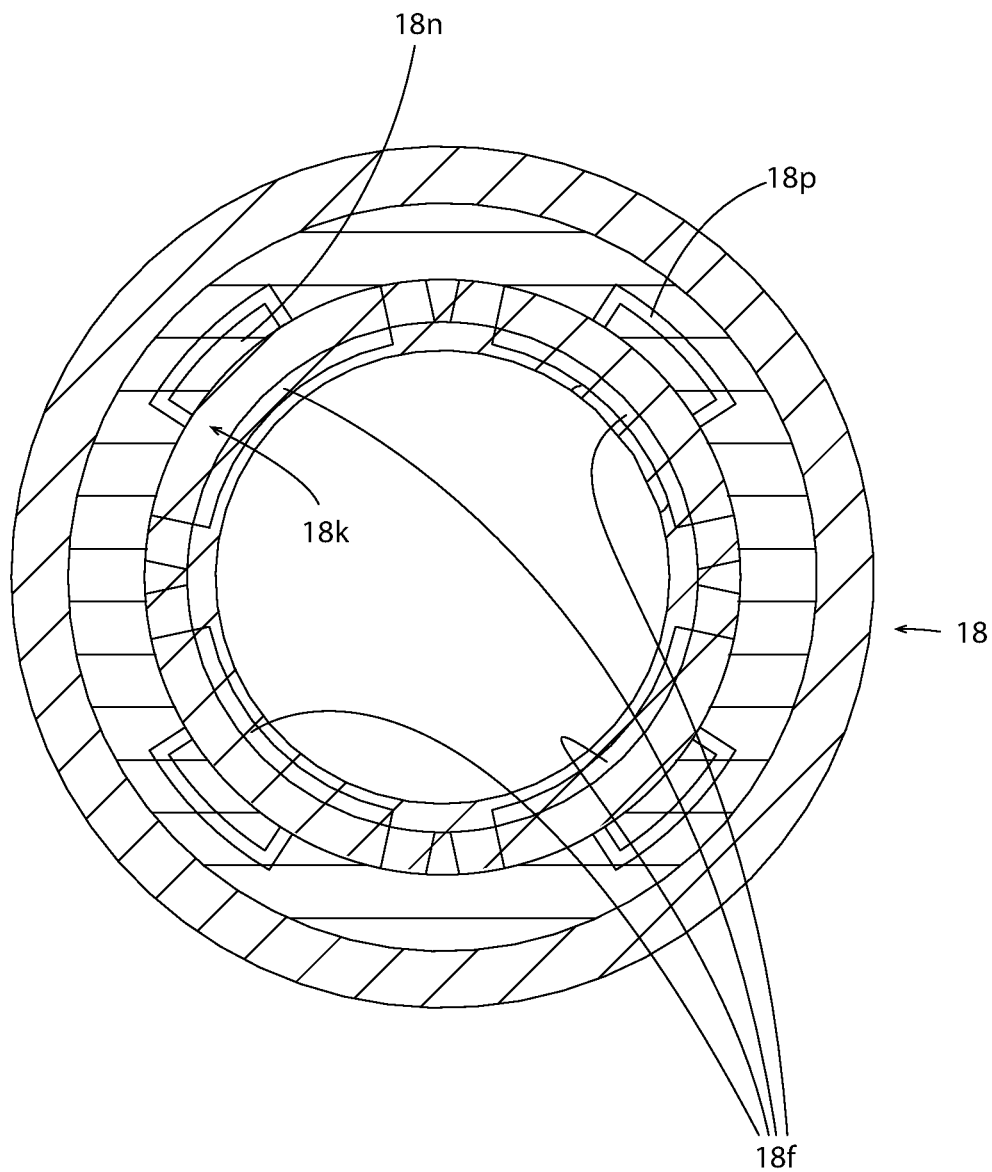
FIG. 17 is a rear elevation view of the housing assembly shown on its own.

Referring to FIGS. 5, 15A and 15B in particular, flosser cartridges 16 are separate, individual components that are preferably designed for single use, i.e., they may be disposed of after a single cleaning event in much the same way as flosser thread. Each flosser cartridge 16 comprises a body 26 that is generally elongate and tubular and is shaped to form a first region 26a and a second region 26b that extends rearwardly from first region 26a. First region 26a and second region 26b are substantially identical in transverse cross-section but first region 26a of reduced dimensions relative to second region 26b. The cross-sectional shape of first region 26a and second region 26b is best seen in FIG. 16. In particular, each of the first region 26a and second region 26b includes a generally circular portion indicated by the reference character "CP" and a generally trapezoidal region indicated by the reference character "TP". The circular portion of the first region 26a is identified as "CP1" and the circular portion of second region 26b is identified as "CP2". Similarly, the trapezoidal region of the first region 26a is identified as "TP1" and the trapezoidal region of the second region 26b is identified as "TP2". The trapezoidal regions "TP1" and "TP2" are separated from the respective circular portions "CP1" and "CP2" by a grooved region "G1" and "G2", respectively. The grooved region "G1" is gently curved while the grooved region "G2" is more angular. The circular portion "CP2" of the second region 26b is of an external diameter that closely approximately the internal diameter of bore 24g of cradle 24b. The trapezoidal region "TP2" of second region 26b closes approximately the shape and size of the slot 24j defined in cradle 24b. The trapezoidal region "TP2" is a projection that serves to ensure that when the second region 26b of each flosser cartridge 16 is engaged in cradle 24b, that second region 26b can only be inserted in a particular orientation. The edges of the cradle 24b that define slot 24j are received in the grooved regions "G2" of second region 26b.

First region 26a originates in an end wall 26c that is oriented at right angles to the longitudinal axis "Y" when flosser cartridge 16 is engaged in cradle assembly 24 and cradle assembly 24 is engaged in housing 18. First region 26a further includes a peripheral wall 26d that extends rearwardly from end wall 26c and terminates in an end wall 26e of second region 26b. End wall 26e of second region 26b is oriented substantially parallel to end wall 26c of first region 26a. A side wall 26f of second region 26b extends rearwardly from end wall 26e and terminates in a rear end wall 26g. Rear end wall 26g is oriented parallel to end walls 26c and 26e. As best seen in FIG. 15B, a bore 26h is defined in at least second region 26b of flosser cartridge 16. Bore 26h originates in an opening defined in rear end wall 26g and extends forwardly for a distance toward end wall 26e. FIG. 15B shows that bore 26h is substantially identical in cross-sectional shape to first region 26a, i.e., it includes a generally circular aperture conjoined with a generally trapezoidal aperture. In particular, bore 26h is complementary in size and shape to first region 26a. The size of bore 26h in cross-section is slightly larger than first region 26a but is smaller than second region 26b. The reason for this configuration is that two exemplary flosser cartridges 16 may be interlockingly engaged with each other by inserting the first region 26e of a rear flosser cartridge 16 into the bore 26h of a flosser cartridge 16 located forwardly of the rear flosser cartridge. The particular cross-section shape of the first region 26a and the complementary bore 26h ensures that the first region 26a can only be received in one particular orientation within the bore 26h. In particular, the circular portion "CP1" of the first region 26a is received in a complementary circular portion of the bore 26h. The trapezoidal region "TP1" of the first region 26a is received in a complementary trapezoidal region of the bore 26h. The edges of the interior surface that define the transition between the circular portion of the bore 26h and the trapezoidal region of the bore 26h are received in the grooves "G1" of the first portion 26a of the rearward flosser cartridge 16. This arrangement not only ensures the cartridges 16 engage each other in a particular orientation but also ensures that the interlock with each other and will move in unison when rotated.

FIG. 15B also shows that a pair of opposed apertures 26j are defined in the side wall 26f of the circular portion (i.e., "CP2"—FIG. 16) of flosser cartridge 16. The apertures 26j are in fluid communication with bore 26h. Additionally, a pair of opposed flanges 26k (FIGS. 15B and 16) are defined on the circular portion "CP1" of first region 26a. Flanges 26k project radially outwardly from the circumference of the circular portion "CP1". Flanges 26k are positioned in such a way that when two flosser cartridges 16 are positioned one behind the other and are interlockingly engaged with each other, each flange 26k of the rear flosser cartridge will each be received through one of the opposed apertures 26j on the front flosser cartridge and thereby interlockingly secure the two flosser cartridges to each other. When cartridges 16 are later separated from each other (after use of the front cartridge), the flanges 26k of the rear cartridge are disengaged from the apertures 26j of the front cartridge.

Additionally, the apertures 26j in a rearmost flosser cartridge 16 of a plurality of flosser cartridges (i.e., the rearmost flosser cartridge 16E of a flosser cartridge stack 16A-16E) are used to interlock that rearmost flosser cartridge with the cradle assembly 24. In particular, snaps 24k' of boss 24k provided on cradle 24b are received through the apertures 26j of the rearmost flosser cartridge. The engagement of flanges 24k' in apertures 26j secures the rearmost flosser cartridge (i.e., flosser cartridge 16E in FIG. 7) to cradle assembly 24 so that the movements of cradle assembly 24 will be transferred to the rearmost flosser cartridge and thereby to the rest of the flosser cartridge stack that is interlockingly engaged with the rearmost flosser cartridge.

In accordance with another aspect of the present disclosure, the trapezoidal region "TP2" of second region 26b has an arcuate outermost wall 26m and one or more ridges 26n extend radially outwardly from this arcuate outermost wall 26m. Ridges 26n form part of the translation mechanism that is utilized to move flosser cartridges through housing 18. The outermost wall is concentric with longitudinal axis "Y". FIG. 15A shows two ridges 26n projecting outwardly from outermost wall 26m. Ridges 26n are spaced longitudinally apart from each other and are shaped, sized, and angled so as to be complementary to the helical groove 18r defined in housing 18. If the outermost wall 26m was circular in transverse cross-section, ridges 26n would form part of a helix circumscribing outermost wall 26m. Ridges 26n are only provided on outermost wall 26m as this is the only part of flosser cartridge 16 that extends through slot 26j of cradle 24b. As cradle assembly 24 is rotated about longitudinal axis "Y", flosser cartridges 16 will rotate in unison with cradle 24b. Because ridges 26n are engaged in groove 18r, as cradle 24b is rotated, flosser cartridges 16 rotate and are therefore caused to ride along groove 18r in a direction towards front end 18b of housing 18. In one example, the remaining exterior surface of the flosser cartridge 16 is free of any ridges 26n that engage in groove 18r. In other words, only the trapezoidal region "TP2" is provided with ridges 26n and there are no ridges elsewhere capable of engaging groove 18r. In other examples, ridges that are capable of engaging groove 18r are additionally provided elsewhere on flosser cartridge.

In accordance with an aspect of the present disclosure, each of the flosser cartridges 16A, 16B, 16C, and 16D may be fabricated of a material that is of the same color. The rearmost flosser cartridge 16E, however, is preferably fabricated of a material that is different in color to the rest of the flosser cartridges 16A-16D. This feature is provided to alert a user of dental device 10 that the user is on the final flosser cartridge 16E loaded into cradle 24. They will become aware of this because the flosser cartridge 16D which is being removed after use is replaced with a different color flosser cartridge 16E for the first time in the cartridge stack. The presentation of the different color flosser cartridge is provided to remind the user they will soon need to engage a replacement cradle 24b and/or a replacement flosser cartridge stack 16A-16E in dental device 10.

In accordance with another aspect of the present disclosure a cleaning tip 28 is provided on flosser cartridge 16. Cleaning tip 28 extends outwardly and forwardly from end wall 26c of the first region 26a of body 26. In particular, cleaning tip 28 is generally located centrally in end wall 26c and will be aligned with or parallel to longitudinal axis "Y" when dental device is assembled. Cleaning tip 28 may be of any suitable construction. In one embodiment, cleaning tip 28 comprises a flosser brush or flosser tip. If the cleaning tip 28 comprises a flosser brush, that brush may be fabricated from a braided metal core 28a (made of two or more strands of wire) and a plurality of bristles 28b which extend radially outwardly from core 28a. Bristles 28b preferably are arranged in a helical pattern. Furthermore, the flosser brush may taper in diameter from proximate end wall 26c to a tip 28c. Core 28a may be of substantially the same diameter from end wall 26c to tip 28c but the whorls of bristles 28b may progressively decrease in diameter from end wall 26c to tip 28c. In one embodiment, a small segment of the core 28a may project outwardly from the helix of bristles 28b to form tip 28c. In another embodiment, bristles 28b may be provided all the way to tip 28c so that no part of core 28a projects outwardly from the bristles 28b. The flosser brush is of a sufficiently small enough diameter but long enough length that the tip 28 may be introduced into an interproximal space in a user's mouth, i.e., into the space defined between two adjacent teeth and the gum. In other instances, other types of cleaning tip 28 may be utilized instead of a flosser brush. For example, the cleaning tip 28 may be a gum stimulator or any other suitable material or suitable device used to clean interproximal spaces.

Figure 15C:
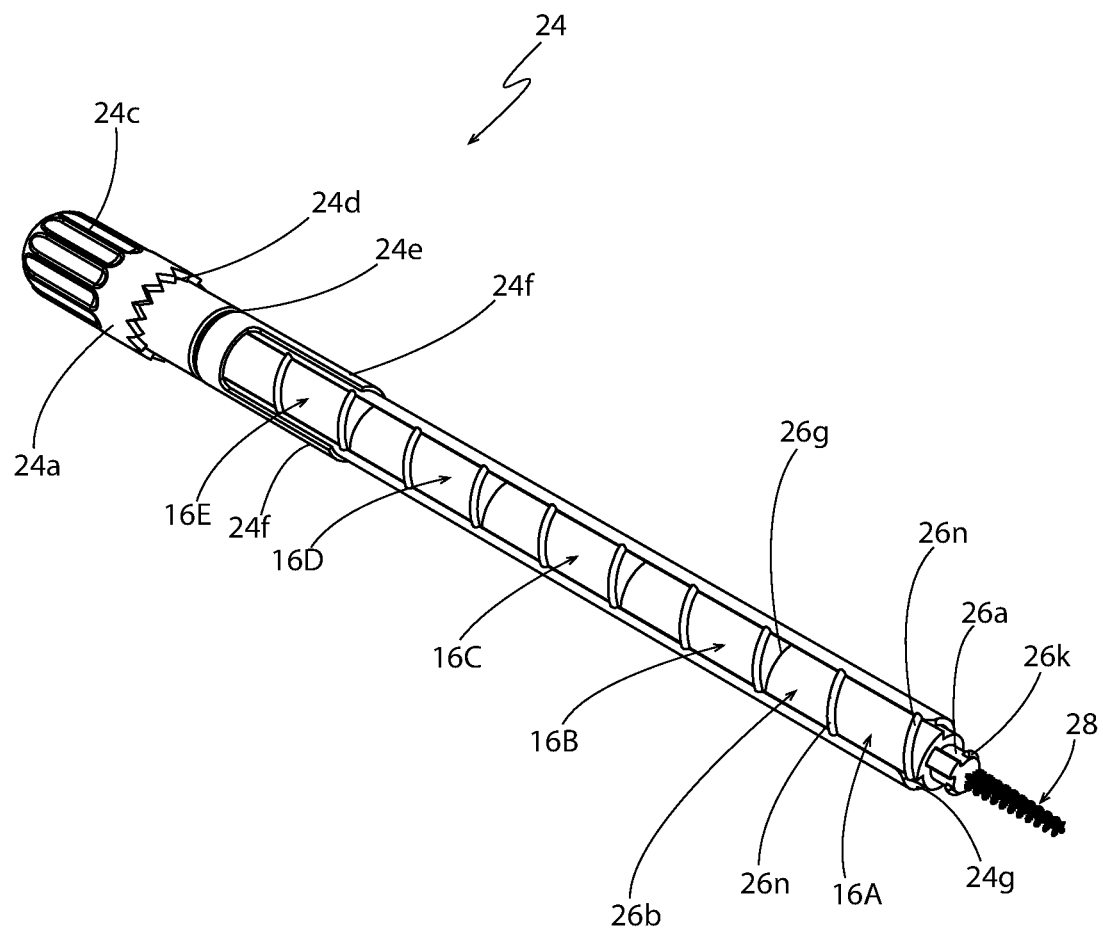
FIG. 15C is front, top, perspective view of a fully loaded cradle assembly.

FIG. 15C shows a plurality of flosser cartridges 16A, 16B, 16C, 16D, and 16E interlockingly engaged with each other and located into the bore 24g of cradle 24b, i.e., a flosser cartridge stack 16A-16E. The flosser cartridges in the stack 16A-16E are interlockingly engaged with each other by inserting the first region 26a of a rear flosser cartridge in the stack of flosser cartridges into the bore 26h (FIG. 15B) of the flosser cartridge in the stack immediately in front of the rear flosser cartridge. For example, the first region 26a of the flosser cartridge 26E is introduced into the bore 26h of the flosser cartridge 26D and the flanges 26k on flosser cartridge 26E are received in the apertures 26j (FIG. 15B) defined in flosser cartridge 26D.

The stack of flosser cartridges 16A-16E are inserted into the bore 24g of cradle 24. Preferably, the flosser cartridges 16A-16E are first interlockingly engaged with each other to form a flosser cartridge stack which is then inserted into the bore 24g with the rear wall 26g of flosser cartridge 26E being introduced first through the opening in the end 24h of cradle 24. However, in other instances, the flosser cartridges may be introduced rear end first and one at a time into the opening defined in end 24h of cradle 24. The flosser cartridges will then be moved rearwardly toward the control knob 24a and are progressively interlocked with each other. The trapezoidal region "TP2" of each flosser cartridge in the stack 16A-16E projects outwardly from slot 24j defined in cradle 24. (This can be seen in FIGS. 15C and 16.) The stack of flosser cartridges 16A-16E is pushed rearwardly through bore 24g and towards boss 24k on control knob 24a until the flanges 24k' on boss 24k are received in the apertures 26j of flosser cartridge 26E. At this point, the cradle assembly 24 and flosser cartridge stack are interlockingly engaged with each other and will move in unison. Because the trapezoidal regions "TP2" extend outwardly through slot 24J, the ridges 24n project outwardly for a distance from slot 24J.

Figure 2A:
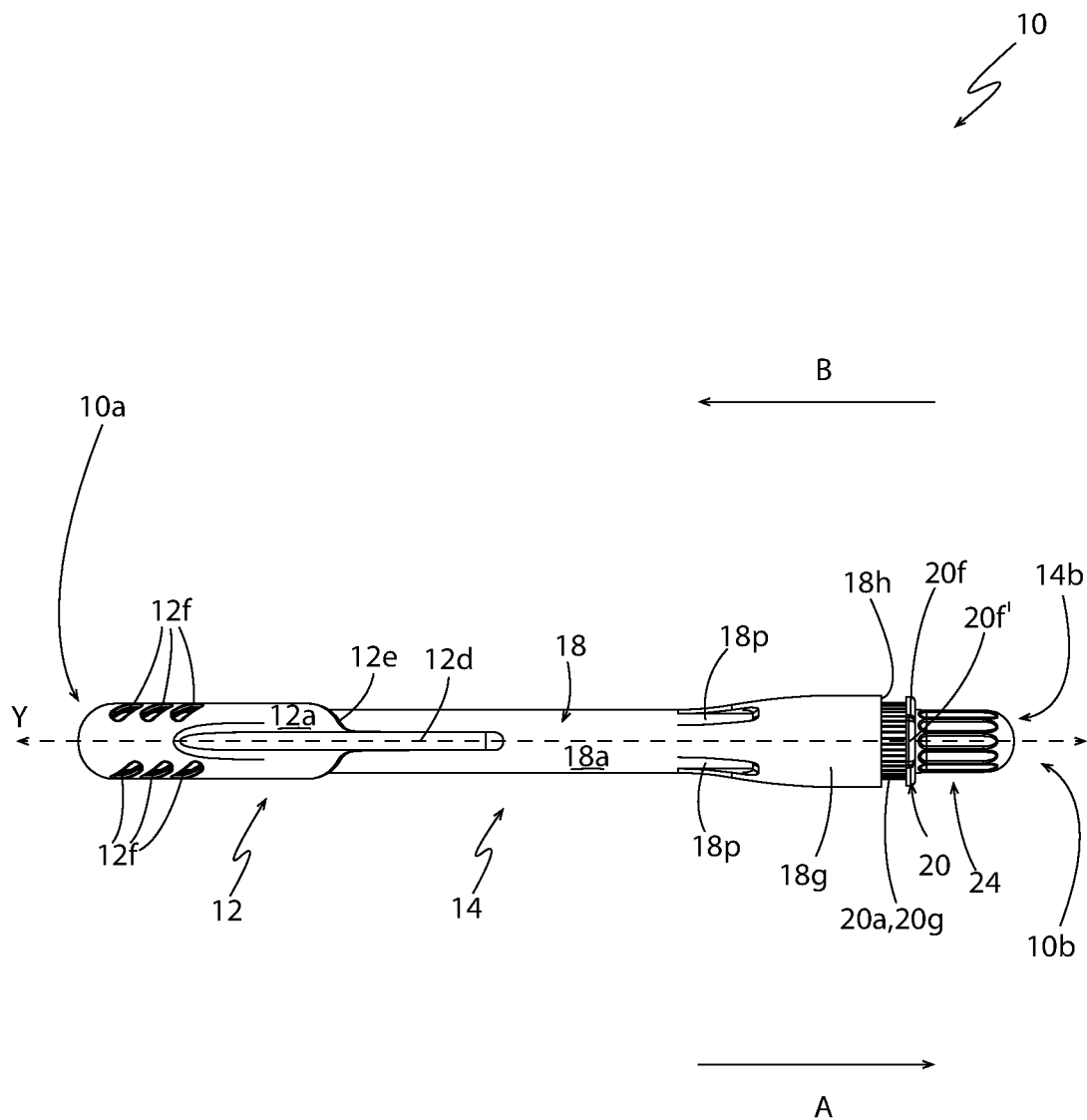
FIG. 2A is a top plan view of the dental device of FIG. 1 shown in an at rest position.
Figure 2B:
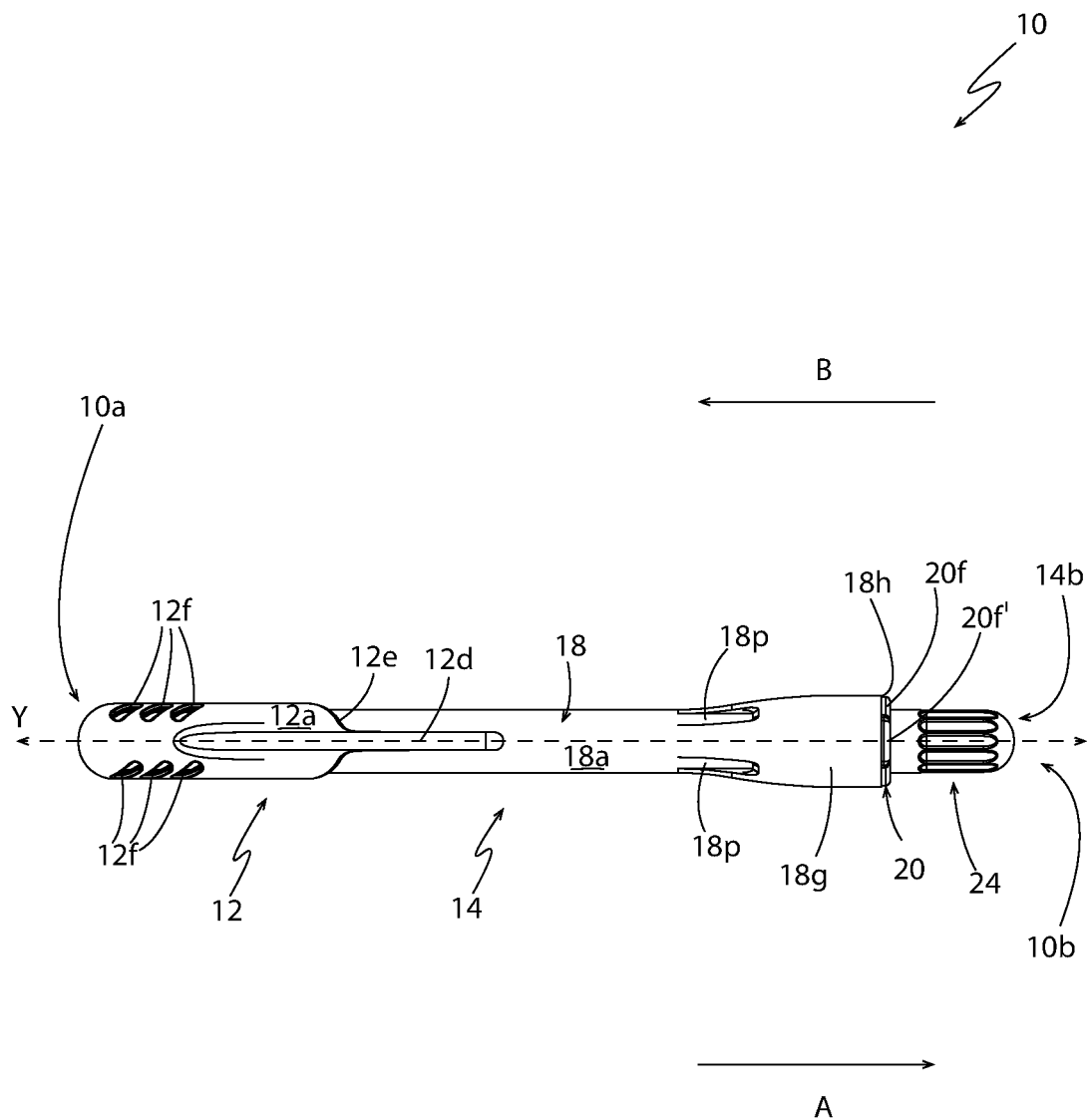
FIG. 2B is a top plan view of the dental device of FIG. 1 shown in an operational position.
Figure 3:
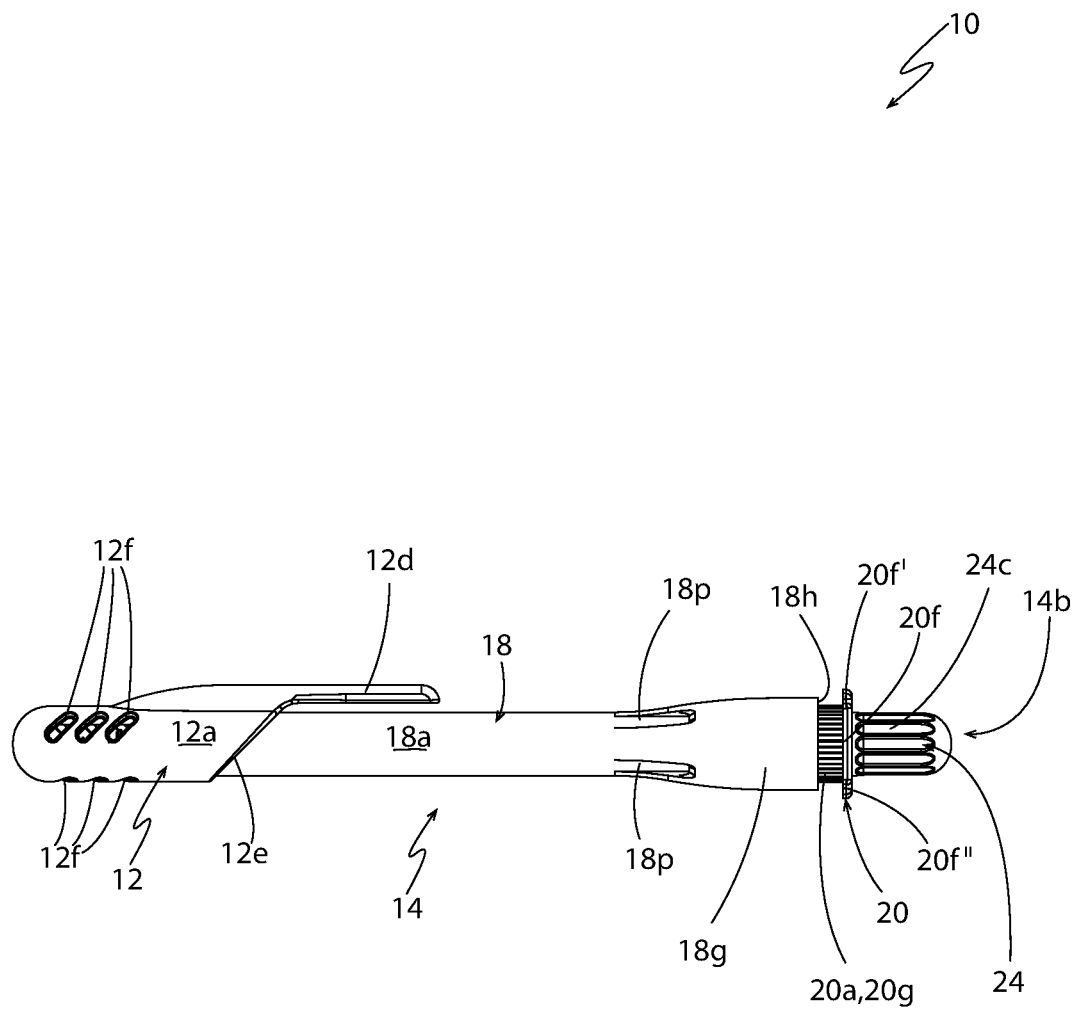
FIG. 3 is a front elevation view of the dental device.
Figure 4:
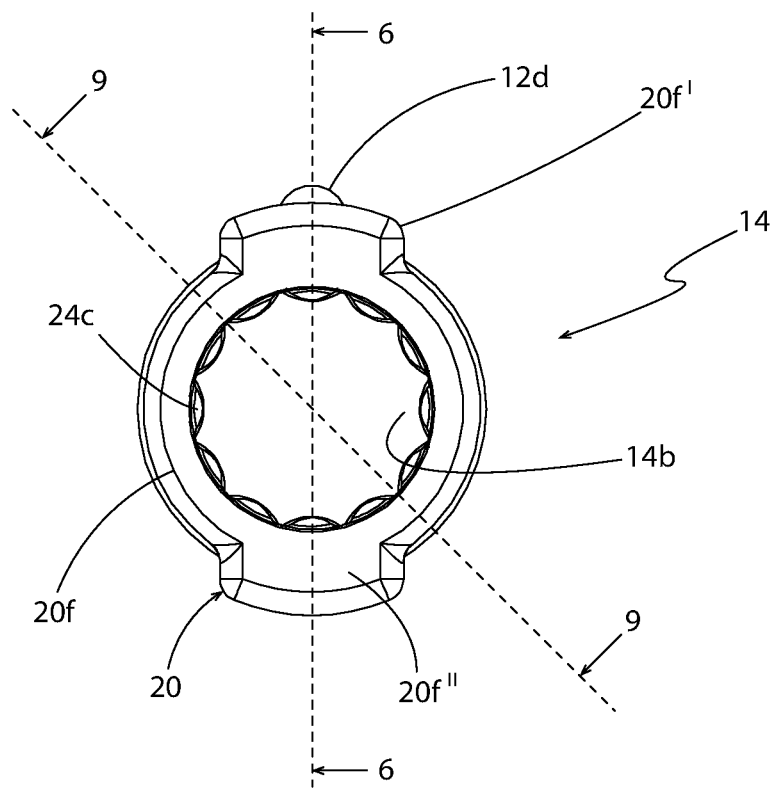
FIG. 4 is a rear elevation view of the dental device.

Dental device 10 is designed to be loaded from the back, i.e., by inserting cradle 24 into an opening defined in rear end 18c of housing 18. If a previously-loaded cradle assembly 24 is spent, i.e., all of the flosser cartridges 16A-16E have been used, the user will need to disengage cradle assembly 24 from housing 18. This is accomplished by the user holding housing 18 in one hand and, grasping control knob 24a between the thumb and index finger/middle finger of the other hand, and pulling cradle 24b rearwardly out of the bore 18d of housing 18 in the direction indicated by arrow "A" (FIG. 2A). The movement in the direction of arrow "A" initially has to overcome the latching engagement of groove 24e on cradle assembly 24 (FIG. 5) with annular ring 18f on housing 18. (It will be understood that in other embodiments, an annular ring may be provided on the cradle and this annular ring may latch with an annular groove provided on housing in which case this latching engagement must be overcome.) When cradle assembly 24 is disengaged from housing 18, the body of housing 18, the spring 22 and locking member 20 remain engaged with each other. In other words, cradle assembly 24 is disengaged from housing assembly 14. It should be noted that no twisting (i.e., rotating control knob 24a of cradle assembly 24 about longitudinal axis "Y") is required in order to disengage cradle assembly 24 from housing assembly 14. A simple linear pulling force is all that is required.

Once cradle 24b is withdrawn from bore 18d, cradle 24b may be loaded with a plurality of flosser cartridges 16A-16E. The latching engagement of the flosser cartridges 16A-16E with each other, their insertion into the bore 24g of cradle assembly 24, and the engagement of the rearmost flosser cartridge 16E with the boss 24k on cradle assembly 24 have previously been generally described herein.

In one example, the cradle assembly 24 is reusable and can be reloaded multiple times. In other words, the housing 18 and cradle 24 may be reused over and over and only the flosser cartridges 16 need to be replaced periodically. The cartridges 16 do not necessarily have to be replaced after a single use but may be used multiple times at the discretion of the user. After a first use, the flosser tip 28 and exposed portions of the flosser cartridge 16 may be cleaned by the user, by rinsing with running water, for example, and are then able to be used again for a second time at the discretion of the user. Placing the cap 12 over the cleaned flosser cartridge keeps the previously used flosser tip 28 as sanitary as possible. The user may decide to use the flosser tip 28 on any particular cartridge only a single time or multiple times before snapping that particular flosser cartridge off the stack and disposing of the same. The choice of whether to remove the flosser cartridge after a single use or after multiple uses with proper cleaning in between, is entirely at the discretion of the user.

As indicated above, the housing 18 and cradle 24 may be reused countless times by simply periodically reloading the cradle 24 with a new flosser cartridge stack or with new individual flosser cartridges. These new flosser cartridges stacks or new individual flosser cartridges may also be termed "replacement flosser cartridge stacks" and "replacement individual flosser cartridges". The new/replacement flosser cartridge stacks and new/replacement flosser cartridges may be purchased along with the dental device 10 or may be separately purchased from the dental device 10. In one example, the cradle assembly 24 is reloaded by the user purchasing a replacement flosser cartridge stack 16A-16E and then inserting the replacement flosser cartridge stack into the cradle 24b. This may be accomplished by inserting a rear end of the replacement flosser cartridge stack 16A-16E (with the rear end of the stack being the rear end of flosser cartridge 16E) into an opening to bore 24g defined in the front end of cradle 24b. In another example, individual flosser cartridges 16 may be loaded one at a time into cradle 24b.

In one example, the cradle assembly 24 may be a disposable component. Once all of the flosser cartridges have been utilized, the cradle assembly 24 is disengaged from the housing assembly 14 and is thrown away. In this instance, a cradle assembly 24 may be loaded with flosser cartridges by machine in a factory and the user will then purchase a fully-loaded replacement cradle assembly 24 and will engage the same with the housing assembly 14 once a spent cradle assembly 24 has been disposed of.

In order to install a new cradle assembly 24 or a recently reloaded cradle assembly 24, the user must first push the spring-loaded, anti-rotation locking member 20 forwardly using the two tabs 20f' and 20f'' on locking member 20. The locking member 20 is pushed forwardly toward front end 18b of housing 18 in the direction of arrow "B" from an at rest position shown in FIGS. 2A and 11 to an operational position shown in FIGS. 2B and 12. This forward motion of locking member 20 compresses spring 22 into the annular recess 18j. The locking member 20 must be held in the forward position, counteracting the spring force, in order to permit cradle 24b of cradle assembly 24 to be inserted the opening defined by the second end 20c of locking member 20. After about 30% of the length of cradle 24b has been inserted into bore 18d, forward motion of cradle 24b tends to stop because front end 24h of cradle 24 contacts shoulder 18e of housing 18 and encounters the helical groove 18r. At this point, the user has to rotate control knob 24a of cradle assembly 24 in a first direction about longitudinal axis "Y" to enable the ridges 26n on the first flosser cartridge 16A to interlockingly engage in groove 18r. Once first flosser cartridge 16A is engaged in groove 18r forward motion of cradle 24 is able resume and, when rotated, the rest of the cradle 24b is able to moves forwardly past shoulder 18e and into and through bore 18. In one example, control knob 24a is rotated in a clockwise direction, indicated by arrow "C" (FIG. 12) in order to effect this forward motion.

Linear motion of cradle 24b within bore 18d in the direction indicated by arrow "B" ceases when the groove 24e on cradle 24b engages ridge 18f on housing 18. Once cradle assembly 24 is latched to housing assembly 14, locking member 20 may be released. Spring 22 will return to its original, non-compressed state and will consequently move locking member 20 linearly and rearwardly toward control knob 24a of cradle assembly 24 in the direction indicated by arrow "A". Locking teeth 20j on locking member 20 become interlockingly meshed with locking teeth 24d on cradle assembly 24. The engagement of locking teeth 20j and locking teeth 24d prevents cradle assembly 24 from being inadvertently twisted or rotated about longitudinal axis "Y". In other words, the engagement of locking teeth 20j and 24d prevents cradle 24b from rotating about longitudinal axis "Y" and thereby prevents flosser cartridges 16A-16E from moving along the helical track and towards front end 18b of housing. The leading flosser cartridge on the cartridge stack will therefore not be accidentally moved into a dispensing position or be moved forwardly to where the cleaning tip 28 will contact the interior surface of cap 12. The leading flosser cartridge on the cartridge stack will also not be accidentally disengaged from the flosser cartridge stack.

It should be noted that the removal of cradle assembly 24 and the reinsertion of a new or reloaded cradle assembly 24 may occur while cap 12 is engaged with front end 18b of housing 18.

Figure 12:
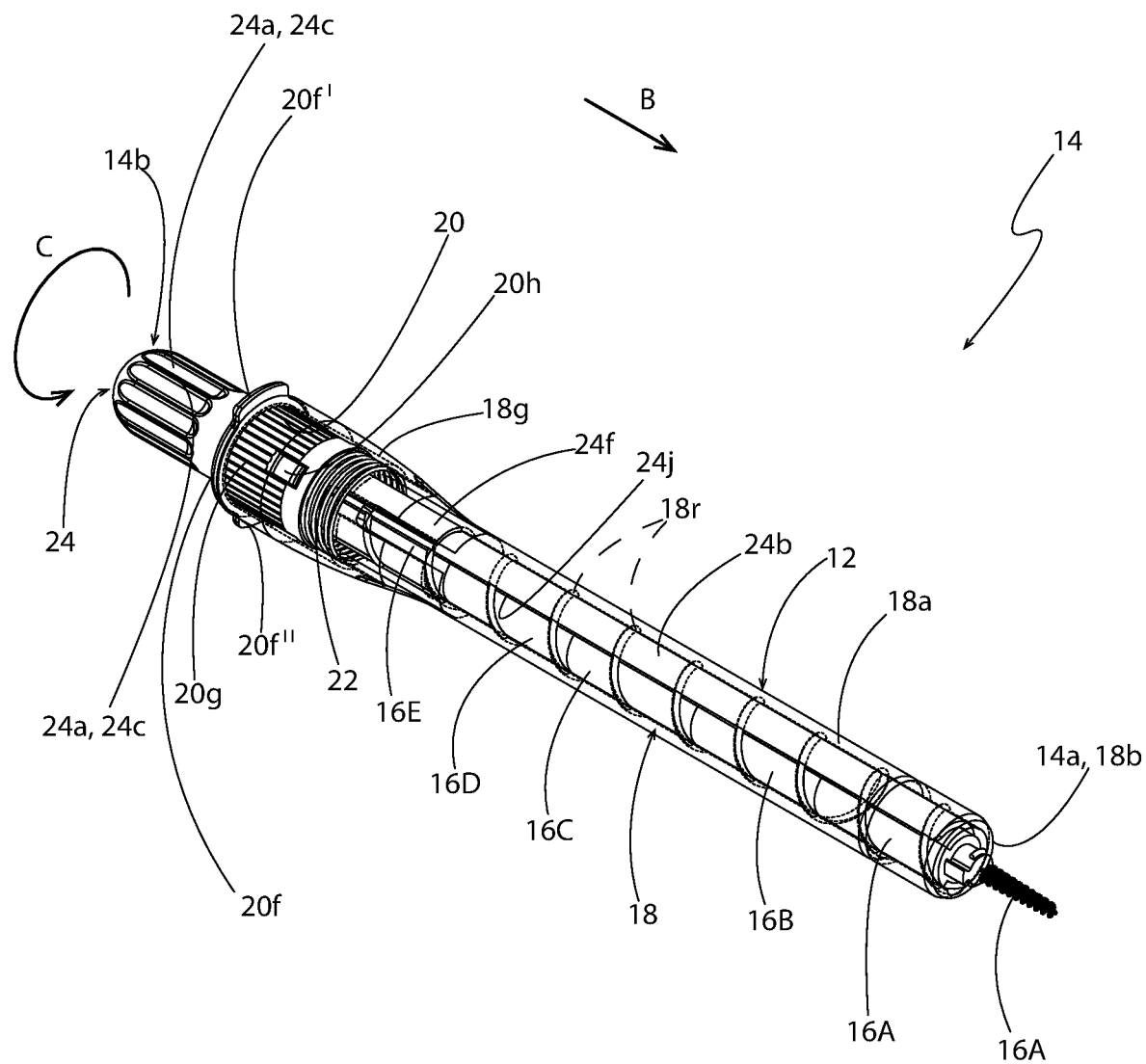
FIG. 12 is a front, top, perspective view of the dental device once the cap has been removed so the first cleaning tip is visible, showing the body housing in phantom, and showing the locking member moved forwardly so that the cradle assembly is free to rotate.
Figure 13:
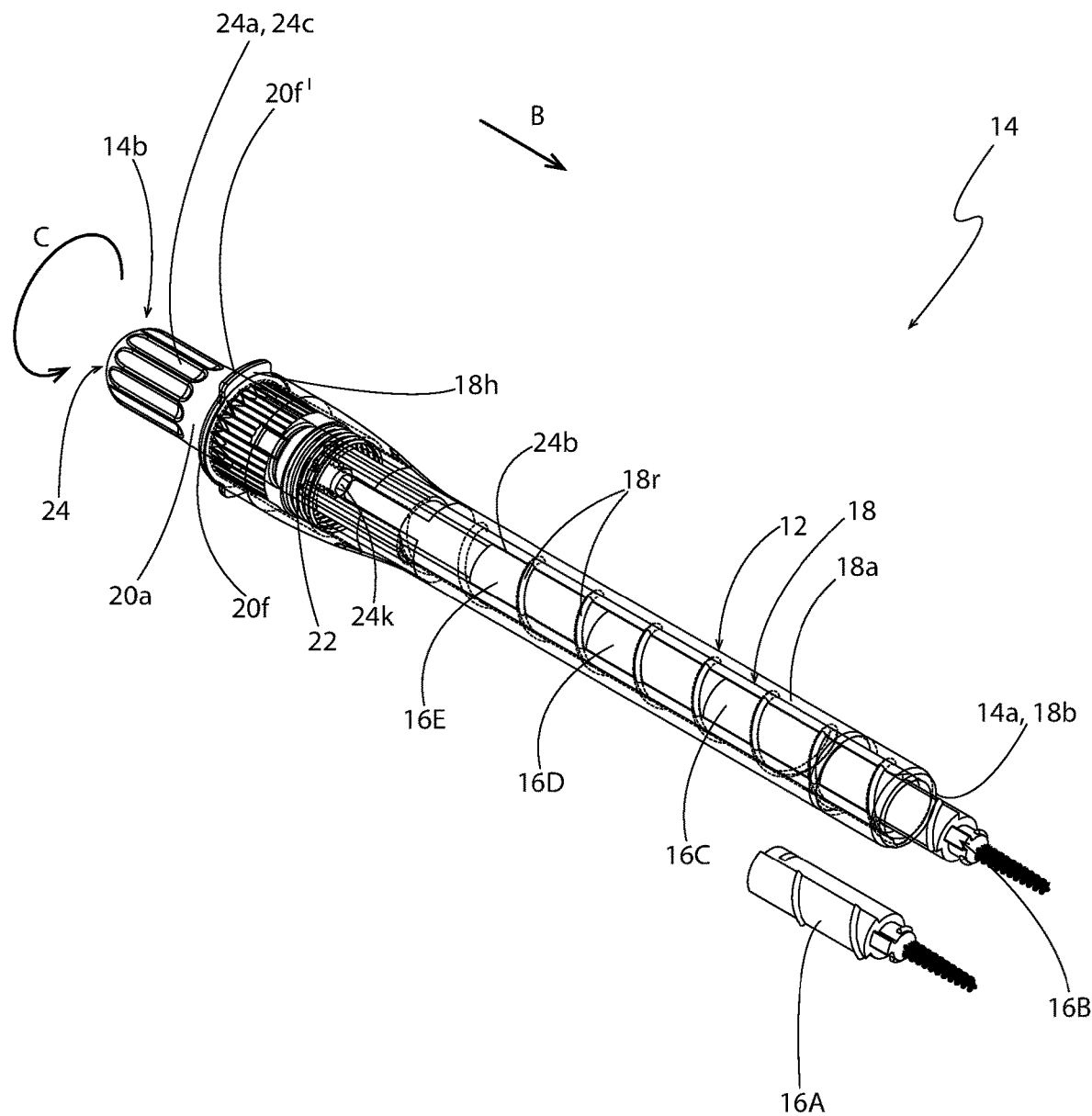
FIG. 13 is a front, top, perspective view of the dental device with the body housing shown in phantom, the first flosser cartridge disengaged from the flosser cartridge stack, and showing a second flosser cartridge moving to a front end of the cradle.

In order to use dental device, cap 12 must be removed from its engagement with front end 18b of housing 18. Cap 12 is simply pulled linearly in the direction indicated by arrow "B" and so that the latching engagement of ring 18q and lock tabs 12c is overcome. Flosser cartridge stack 16A-16E must then be moved into a use position (also referred to herein as a dispensing position). In order to move flosser cartridges 16 forwardly within bore 18d so that first flosser cartridge 16A is presented for use, the spring-loaded, anti-rotation locking member 20 is pushed forwardly toward the front end 18b of housing 18 in the direction indicated by arrow "B". As previously described, this movement of locking member 20 in the direction of arrow "B" (FIGS. 2 and 7) is accomplished by the user pushing tabs 20f' and 20f" on locking member 20 toward front end 18b of housing 18. The motion in the direction "B" breaks the interlocking engagement between locking teeth 20j and 24d. Locking member 20 must be held in this forward position by the user to counteract the spring force provided by spring 22. Once locking teeth 20j and 24d are no longer engaged, cradle assembly 24 is free to rotate about longitudinal axis "Y". The possible rotational motion is indicated in FIG. 12 by arrow "C", i.e., in a clockwise direction. In other examples, in order to move flosser cartridges 16A-16E to the dispensing position, rotational motion of control knob 24a may be in the opposite direction to arrow "C", i.e., counter-clockwise direction. The direction required depends on the specific configuration of the helical groove 18r. The user rotates the cradle, for example, in the clockwise direction, "C", overcoming the engagement between flanges 24k" and the apertures 16j defined on the rearmost flosser cartridge 16E. Rotation of control knob 24a causes the flosser cartridge stack 16A-16E to ride along helical groove 18r and toward front end 18b, rotating about longitudinal axis "Y" as it does so. It should be noted that rotating cradle assembly 24 about the longitudinal axis "Y" causes the ridges 26n on flosser cartridges 16A-16E to travel along in the helical groove 18r. (It will be understood that in other embodiments, grooves may be provided on each of the flosser cartridges 16A-16E and a cooperating ridge may be provided on housing's interior surface which defines bore 18d and this configuration will cause a similar motion of flosser cartridges.) Rotating control knob 24a through approximately 1.5 rotations will fully twist the first flosser cartridge 16A of a fully loaded flosser cartridge stack 16A-16F out of bore 18d.

As indicated earlier herein, the first embodiment cradle 24b is generally C-shaped in cross-section and, in particular, the C-shape comprises about 270 degrees of a circumference of a circle. The opening in the C-shape, i.e., slot 24j, comprises about 90 degrees of the remaining circumference of the circle. This cross-sectional shape of cradle 24b has been found to be sufficiently inflexible when cradle assembly 24 is rotated about longitudinal axis "Y" to ensure flosser cartridges 16A-16E are most easily rotated and advanced forwardly through bore 18d, and are ultimately dispensed therefrom.

Once the forwardmost flosser cartridge 16 is presented for use, the user may hold housing 18 between their thumb and their index and middle fingers and insert cleaning tip 28 into the gap between two teeth in their mouth, i.e., into the interproximal space. Housing 18 is then moved up, down, in, out, etc. in order to cause similar motions of cleaning tip 28. Cleaning tip 28 removes plaque and food debris from the interproximal space. Once a first interproximal space in the mouth is cleaned, the user may manipulate housing 18 to position cleaning tip 28 in a second interproximal space and continue the cleaning process. When the cleaning is completed, the user will push the locking member 20 forwardly in the direction of arrow "B" and rotate control knob 24b until the entire length of the leading flosser cartridge 16A, for example, is clear of the front end 18b of housing 18. Grasping the body of the leading flosser cartridge 16A between the thumb and index finger, the user will manipulate flosser cartridge 16A to break the engagement between flanges 26k on flosser cartridge 16B and apertures 26j on flosser cartridge 16A. Flosser cartridge 16A may then be disposed of (at the discretion of the user) and flosser cartridge 16B may be rotated into a dispensing position for later use. Cap 12 is then reengaged with housing 18 to protect flosser cartridge 16B.

The above-described process is repeated until the final flosser cartridge 16E is presented for use. As indicated earlier herein, flosser cartridge 16E is preferably fabricated from a different color material from the rest of the flosser cartridges 16A-16E. This different color helps to make it evident to the user that the last flosser cartridge in the flosser cartridge stack is now in the position for use. That way, the user has forewarning that replacement flosser cartridges or a replacement cradle assembly 24 loaded with flosser cartridges, or a replacement dental device 10 will be needed once the current cartridge 16E is used. It will be understood that other ways of indicating that flosser cartridge 16E is the final cartridge in the stack may be utilized instead of making the final cartridge 16E a different color.

When not in use, dental device 10 may be clipped onto a shirt pocket using clip 12d in a similar fashion to a pen. Alternatively, the dental device may be placed into a purse, pocket, briefcase, bathroom vanity drawer or any other location until its use is required. The cap 12 protects the cleaning tip 28 from damage through contact with other objects. The cap 12 also helps to prevent contamination of cleaning tip 28 and thereby helping to ensure that the cleaning tip 28 is maintained in a hygienic state, ready for use.

Figure 18:
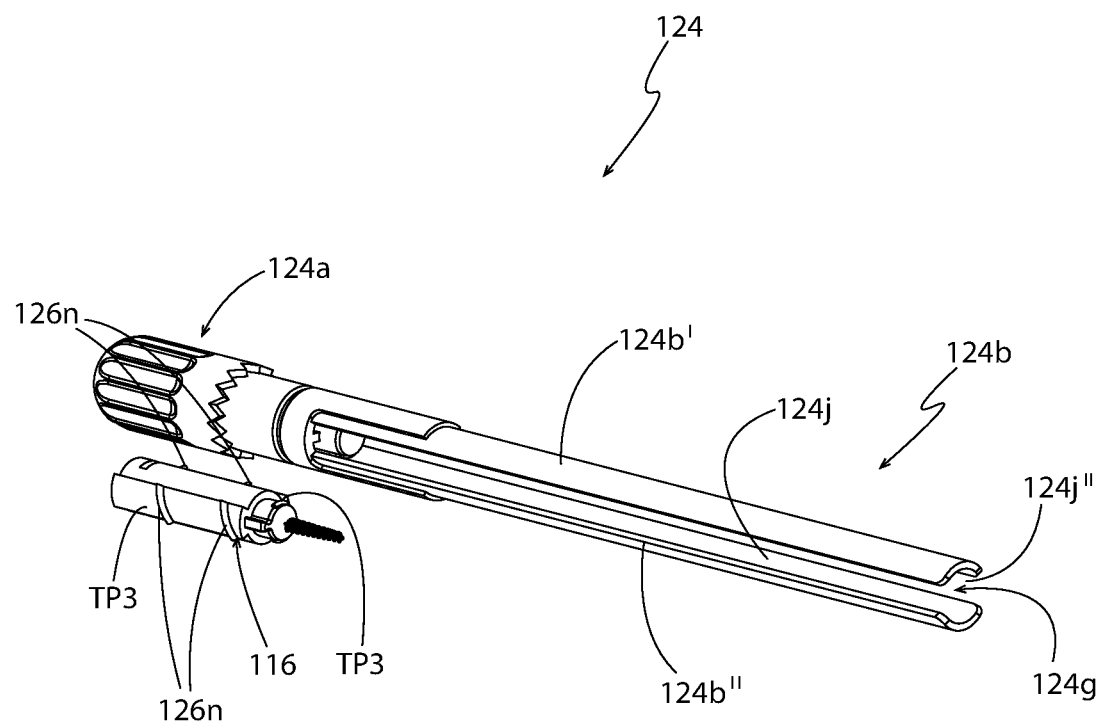
FIG. 18 is a front, top, perspective view of a second embodiment of a cradle assembly for use with the dental device, with a complementary second embodiment of a flosser cartridge shown exploded away therefrom.

FIG. 18 shows a second embodiment cradle assembly 124 that may be utilized in dental device 10 in place of cradle assembly 24. Cradle assembly 124 has a slightly different structure to cradle assembly 24 but functions in substantially the same way as cradle 24. Cradle 124 has a control knob 124*a* which is substantially identical in structure and function to control knob 24*a* of cradle assembly 24. Cradle assembly 124 further includes a cradle 124*b* that is received in the bore 18*d* of housing 18. Cradle 124*b* differs from cradle 24*b* in that instead of being a single elongate member that is C-shaped and extending through about 270 degrees of a circumference of a circle, cradle 124*b* comprises two opposed elongate members that are receivable in bore 18*d*. In particular, cradle 124*b* includes two opposed arms 124*b*' and 124*b*", with each arm 124*b*', 124*b*" being curved and extending through about ninety degrees of the circumference of a circle. A first slot 124*j*' is defined between a first pair of adjacent edges of arms 124*b*' and 124*b*". A second slot 124*j*" is defined between a second pair of adjacent edges of arms 124*b*' and 124*b*". While flosser cartridges 16 might be able to be engaged with cradle assembly 124, preferably specially configured complementary flosser cartridges 116 are engaged with cradle assembly 124. Flosser cartridges 116 are substantially similar flosser cartridges 16 except that they are configured to have two opposed trapezoidal regions "TP3" formed thereon instead of a single trapezoidal region "TP2". Each trapezoidal region "TP3" will be similar in structure and function to region "TP2" but will be configured to be complementary in shape and size in order to be received within one of the slots 124*j*' or 124*j*" defined between the arms 124*b*' and 124*b*". Each trapezoidal region "TP3" will extend at least partially out of one the slots 124*j*' and 124*j*" and ridges 126*n* will be provided on the outermost curved surface of each of the two trapezoidal regions "TP3". Ridges 126*n* are configured to engage the cooperating complementary groove 18*r* defined on the interior surface of the housing 18 in the same way that ridges 26*n* engage helical groove 18*r*. All other features of flosser cartridges 116 are substantially similar to cartridges 16 and flosser cartridges 116 function in substantially an identical way to flosser cartridges 16. The second embodiment cradle assembly 124 functions well but the cradle 124*b* is slightly more flexible than the cradle 24*b* and therefore more careful or precise handling of cradle assembly 124 may be required to advance flosser cartridges 116 into a use position.

Figure 19:
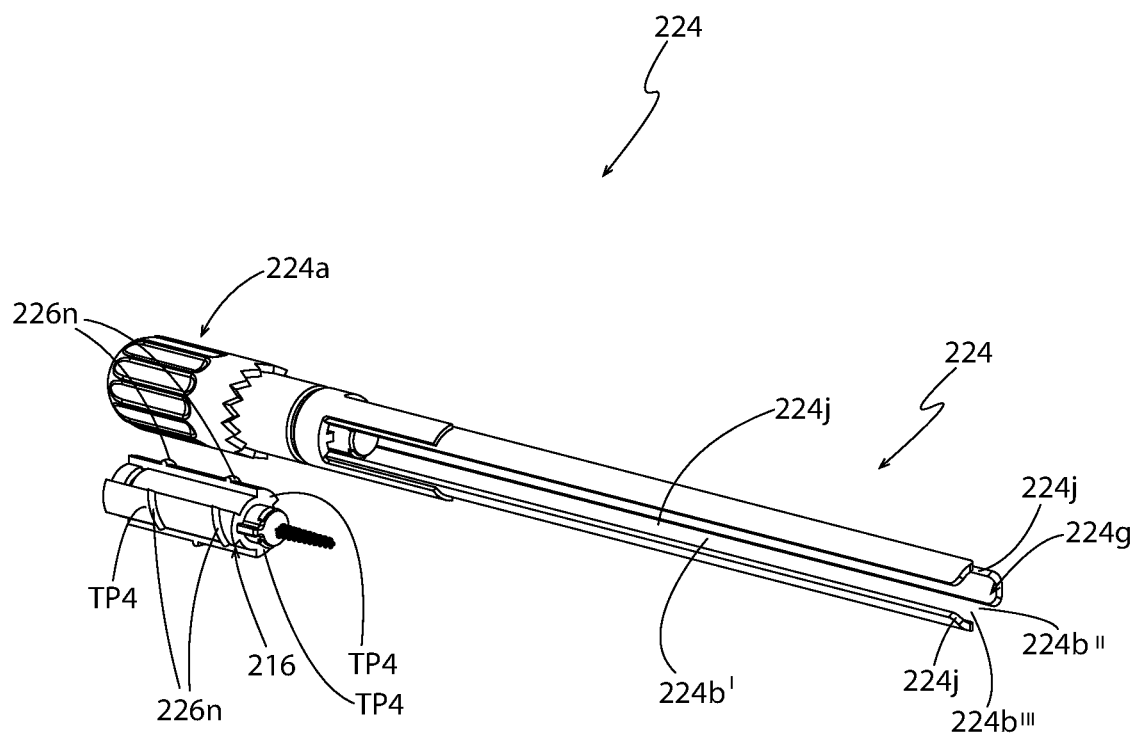
FIG. 19 is a front, top, perspective view of a third embodiment of a cradle assembly for use with the dental device, with a complementary third embodiment of a flosser cartridge shown exploded away therefrom.

FIG. 19 shows a third embodiment cradle 224 that be utilized in dental device 10 in place of cradle assembly 24 or cradle assembly 124. Cradle assembly 224 has a slightly different structure to cradle assembly 24 and to cradle assembly 124 but functions in substantially the same way as either of cradle 24 and cradle 124. Cradle 224 has a control knob 224*a* which is substantially identical in structure and function to control knob 24*a* of cradle assembly 24 or control knob 124*a* of cradle assembly 124. A cradle 224*b* extends outwardly away from control knob 224*a* and is received in the bore 18*d* of housing 18. Cradle 224*b* differs from cradle 24*b* and from cradle 124*b*. In particular, instead of being a single elongate member that is C-shaped like cradle 24*b*, or being a pair of elongate members that are opposed like arms 124*b*' and 124*b*" like cradle 124*b*, cradle 224*b* comprises three elongate members. In particular, cradle 224*b* comprises three arms 224*b*', 224*b*", and 224*b*''', each of which is curved and comprises about sixty degrees of the circumference of a circle. A slot 224*j* is defined between the edges of circumferentially-adjacent arms 224*b*', 224*b*", 224''' and the slots 224*j* are equidistantly-spaced from each other about the circumference of the circle. Flosser cartridges 216 are substantially similar to flosser cartridge 16 shown in FIGS. 15A and 15B but are configured to have three opposed trapezoidal regions "TP4" formed thereon. Each trapezoidal region "TP4" is configured to be complementary to one of the slots 224*j* and is designed to be received therein. Each trapezoidal region "TP4" will extend at least partially out of one the slots 224 and ridges 226*n* are provided on each of the three trapezoidal regions "TP4" to engage the cooperating complementary groove 18*r* defined on the interior surface of the housing 18 that defines bore 18*d*. Flosser cartridge 216 cooperates with cradle assembly 224 in substantially the same manner as flosser cartridge 16 in cradle assembly 24 and flosser cartridge 116 with cradle assembly 124. The third embodiment cradle assembly 224 functions well but the cradle 224*b* is more flexible than the cradle 24*b* and therefore may require more careful handling of cradle assembly 224 in order to cause flosser cartridges 216 to be presented for use.

While the cradle assembly has been essentially described herein as being comprised of a control knob 24*a* and one of three different embodiments of cradle that are frictionally engaged therewith, i.e., cradle 24*b*, 124*b*, 224*b*, it will be understood that in other embodiments, any of the cradles 24*b*, 124*b* or 224*b* may be integrally formed with (or permanently secured to) control knob 24*a*.

While the C-shape of cradle 24*b* has been described herein as encompassing about 270 degrees of a circumference of a circle, it will be understood that a C-shape that encompasses more than 270 degrees of a circumference of a circle or less than 270 degrees of a circumference of a circle may be utilized instead. It will further be understood that a complementary trapezoidal region will be provided on the associated flosser cartridges that will ensure interlocking engagement between the flosser cartridges and the cradle.

A method for using dental device 10 includes rotating a cradle 24*b* carrying one or more cartridges 16 within a bore 18*d* of a housing 18 of a dental device 18; moving the one or more cartridges 16 forwardly within the bore 18*d* and towards an opening defined in a front end 18*b* of the housing 18 as the cradle 24*b* is rotated; extending a cleaning tip 28 of a first cartridge 16E of the one or more cartridges 16 outwardly from the opening in the front end 18*b* of the housing 18; and cleaning at least one interproximal space in a user's mouth with the cleaning tip 28. The rotating of the cradle 24*b* is preceded by moving a locking member 20 forwardly in the direction of arrow "B" and toward the front end 18*b* of the housing 18 and then holding the locking member 20 in a forward position while rotating the cradle 24*b*. The method includes disengaging locking teeth 20*j* on the locking member 20 from locking teeth 24*d* provided on the cradle 24*b* when the locking member 20 is moved forwardly. Spring 22 is compressed by the locking member 20 as the locking member 20 moves forwardly in the direction of arrow "B". The moving of the locking member 20 includes contacting at least one tab 20*f*, 20*f*'" on the locking member 20 with a user's fingers, and applying a pushing force to the at least one tab 20*f*, 20*f*'" in the direction of arrow "B" and thereby applying the force to the locking member 20 in order to move the locking member forwardly in the direction of arrow "B".

The method further includes removing a cap 12 from engagement with the front end 18*b* of the housing 18. The removing of the cap 12 includes applying a pulling force to the cap 12 and overcoming a latching engagement between tabs 12*c* on the cap and a locking ring 18*q* on the housing 18.

In the method, the moving of the one or more cartridges 16 forwardly within the bore 18*d* includes guiding the one or more cartridges along a helical track formed by helical groove 18r on housing 18 and ridges 26n on cartridges 16. The method further includes rotating the one or more cartridges 16 within the bore 18 and about the longitudinal axis as the one or more cartridges 16 are guided along the helical track 18r, 26n.

The method further comprises moving at least a first region 26a of a first cartridge 16A of the one or more cartridges 16A-16E out of the opening in the front end 18b of the housing 18. The moving of the at least the first region 26a of the first cartridge 16A is preceded by overcoming a latching force provided by a snap 24k' on the cradle 24b that engages in an aperture 26j defined in a rearmost cartridge 16E of the one of the one or more cartridges 16A-16E. The method further includes rotating the cradle 24b through about 1.5 rotations to fully twist the first cartridge 16A out of the housing. The method further includes overcoming a latching force provided by one or more tabs 26m provided on a first region 26a of a second cartridge 16B that are engaged in one or more apertures 26j defined in a second region 26b of the first cartridge 16A; and manually removing the first cartridge 16A, should the user wish to do so at that time. Alternatively, the user may select to properly clean the first cartridge 16A and use that same first cartridge one or more times as previously described herein. In one example, the method further includes covering the cleaning tip 28 of a second cartridge 16B with a cap 12 once the flossing of the at least one interproximal space is completed with the first cartridge 16A and after removal of the first cartridge 16A, and securing the cap 12 to the housing 18.

The method further comprises interlocking the one or more cartridges 16A-16E to each other and forming a cartridge stack and moving the one or more cartridges 16A-16E in the cartridge stack forwardly through the bore 18d of the housing 18 in unison with each other. The interlocking of the one or more cartridges 16A-16E into the cartridge stack includes providing a plurality of cartridges 16A-16D of a first color; providing one cartridge 16E of a second color that is different from the first color; interlocking the plurality of cartridges 16A-16D of the first color together; and engaging the one cartridge 16E of the second color with a rearmost cartridge 16D of the plurality of cartridges 16A-16D of the first color. The method includes engaging the cartridge stack 16A-16E in the cradle 24b such that the one cartridge 16E of the second color is located remote from the front end 18b of the housing 18 and is the last cartridge to be dispensed from the cradle 24b. The method further includes engaging a projection "TP2" provided on each of the one or more cartridges 16A-16E in a slot 24j defined in the cradle 24b; and moving the one or more cartridges 16A-16B in unison with the cradle 24b.

The method further includes disengaging the first cartridge 16A from a second cartridge 16B of the one or more cartridges 16A-16E, disposing of the disengaged first cartridge 16A; rotating the cradle 24b and advancing the second cartridge 16B forwardly within the bore 18b; and extending a cleaning tip 28 of the second cartridge 16B outwardly from the opening in the front end 18b of the housing 18; covering the cleaning tip 28 of the second cartridge 16B with a cap 12; and securing the cap 12 to the housing 18.

The method further includes dispensing all of the one or more cartridges 16A-16E from the cradle 24b; grasping a control knob 24a on a rear end of the cradle 24b; overcoming an engagement of a latching mechanism 24e, 18k, 18n between the cradle 24b and the housing 18; and pulling the cradle 24b linearly rearwardly and out of bore 18d defined in the housing 18. The method further includes disposing of the cradle 24b and engaging a fully loaded cradle in the bore 18d of the housing 18. In one example, the engaging of a fully loaded cradle includes reloading the cradle 24b with a replacement stack of one or more cartridges 16A-16E to form the fully loaded cradle. The reloading includes moving a locking member 20 forwardly in the direction of arrow "B" and toward the front end 18b of the housing 18; compressing a spring 22 as the locking member 20 is moved forwardly, holding the locking member 20 in the forward position; counteracting a spring force provided by the compressed spring 22; and inserting a free end of the fully loaded cradle 24b into the bore 18d of the housing 18 through an opening in the rear end 18c of the housing 18. The method further includes pushing the fully loaded cradle 24b forwardly toward the front end 18b of the housing 18 until forward motion of the cradle 24b is temporarily halted; rotating the fully loaded cradle 24b in a first direction "C" about a longitudinal axis "Y" of the housing 18; and continuing to move the fully loaded cradle 24b forwardly toward the front end 18b of the housing 18 until a latching mechanism 24e, 18k, 18n latches the cradle 24b to the housing 18. The method further includes releasing the locking member 20; and moving the locking member 20 rearwardly in a direction "A" to an at-rest position under spring force. The method further includes engaging locking teeth 20j on the locking member with locking teeth 24d on the cradle 24b; preventing the cradle 24b from rotating within the bore 18d; and preventing the one or more cartridges 16A-16E from advancing through the bore 18d.

The method further includes providing a tubular member 18a as the housing 18; engaging a cap 12 on an end 18b of the tubular member 18a; causing the tubular member 18a and cap 12 together to resemble a pen.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0. % of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A dental device comprising:
   a housing having a front end, a rear end, and a longitudinal axis extending between the front end and the rear end;
   a bore defined in the housing and extending longitudinally between the front end and the rear end;
   a cradle assembly;
   one or more flosser cartridges carried by the cradle assembly, each of the one or more flosser cartridge including a cleaning tip; wherein at least a portion of the cradle assembly that carries the one or more flosser cartridges is received in the bore and is selectively rotatable about the longitudinal axis; and
   a translation mechanism operable to move the one or more flosser cartridges relative to the portion of cradle assembly and through the bore towards an opening defined in the front end of the housing.

2. The dental device of claim 1, wherein the translation mechanism includes:
   a groove defined in one of an interior surface of the housing that defines the bore and an exterior surface of each of the one or more flosser cartridges; and
   a ridge defined on the other of the interior surface of the housing and the exterior surface of each of the one or more flosser cartridges, wherein the groove and ridge are complementary and the ridge is received in the groove.

3. The dental device of claim 2, wherein the groove is defined in the interior surface of the housing and is a helical groove.

4. The dental device of claim 2, wherein the portion of the cradle assembly includes one or more elongate members that bound and define a bore within which the one or more flosser cartridges are received.

5. The dental device of claim 4, wherein the portion of the cradle assembly defines at least one slot that is in communication with the bore of the cradle assembly; and wherein a region of the one or more flosser cartridges extends through the at least one slot.

6. The dental device of claim 5, wherein the ridge is provided on the region of the one or more flosser cartridges that extends through the at least one slot.

7. The dental device of claim 4, wherein the one or more elongate members comprises a single elongate member that is C-shaped in cross-section.

8. The dental device of claim 7, wherein the single elongate member extends through about 270 degrees of a circumference of a circle, and the portion of the cradle assembly further defines a slot that extends through about 90 degrees of the circumference of the circle.

9. The dental device of claim 4, wherein the cradle assembly further includes a control knob, and the one or more elongate members extend longitudinally outwardly from the control knob; and wherein at least a portion of the control knob is located outside the bore of the housing.

10. The dental device of claim 9, further comprising a locking member that is interposed between the cradle assembly and the rear end of the housing.

11. The dental device of claim 10, further comprising one or more first locking teeth provided on the locking member and one or more second locking teeth provided on the cradle assembly; wherein the locking member is movable linearly relative to the housing between a first position and a second position; and when the locking member is in the first position the first locking teeth and the second locking teeth are engaged and the cradle assembly cannot rotate about the longitudinal axis; and when the locking member is in the second position, the first locking teeth are disengaged from the second locking teeth and the cradle assembly is able to rotate about the longitudinal axis.

12. The dental device of claim 11, further comprising a spring that biases the locking member into the first position.

* * * * *